United States Patent
Tanaka et al.

(10) Patent No.: US 11,548,468 B2
(45) Date of Patent: Jan. 10, 2023

(54) OCCUPANT PROTECTION SYSTEM

(71) Applicant: TOYODA GOSEI CO., LTD., Kiyosu (JP)

(72) Inventors: Motoyuki Tanaka, Kiyosu (JP); Takeki Hayashi, Kiyosu (JP); Yasushi Masuda, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 111 days.

(21) Appl. No.: 17/017,994

(22) Filed: Sep. 11, 2020

(65) Prior Publication Data
US 2021/0094504 A1 Apr. 1, 2021

(30) Foreign Application Priority Data

Sep. 30, 2019 (JP) .............................. JP2019-178712
Sep. 30, 2019 (JP) .............................. JP2019-178714

(51) Int. Cl.
*B60R 21/18* (2006.01)
*B60R 21/231* (2011.01)
*B60R 21/00* (2006.01)

(52) U.S. Cl.
CPC ........ *B60R 21/23138* (2013.01); *B60R 21/18* (2013.01); *B60R 2021/0044* (2013.01);
(Continued)

(58) Field of Classification Search
CPC .............. B60R 21/23138; B60R 21/18; B60R 2021/004; B60R 2021/0048;
(Continued)

(56) References Cited

U.S. PATENT DOCUMENTS 3,948,541 A * 4/1976 Schulman ............... B60R 21/18
244/122 B
5,871,230 A * 2/1999 Lewis ..................... B60R 22/14
280/743.1
(Continued)

FOREIGN PATENT DOCUMENTS

EP 3708438 A1 * 9/2020 ........... B60R 21/207
JP H06199200 A 7/1994
(Continued)

OTHER PUBLICATIONS

Office Action dated Aug. 19, 2022 of Japanese Patent Application No. 2019-178712 (and English machine translation).
(Continued)

*Primary Examiner* — Karen Beck
(74) *Attorney, Agent, or Firm* — Posz Law Group, PLC

(57) ABSTRACT

An occupant protection system for protecting a vehicle occupant sitting in a seat includes a seatbelt that includes a lap belt for arresting the pelvis of the occupant, and an airbag that is stored in the lap belt. The airbag as deployed includes a main inflatable portion for protecting an upper body of the occupant, and a head protecting portion that is located in a vicinity of an upper end of the main inflatable portion for protecting a head of the occupant. The head protecting portion includes a front inflatable portion for covering a front side of the head, and a pair of side inflatable portions that extend rearward from left and right ends of the front inflatable portion for covering sides of the head. Each of the side inflatable portions is configured to be deployed in such a manner that a space is formed between itself and the head.

8 Claims, 22 Drawing Sheets

(52) U.S. Cl.
CPC ............... *B60R 2021/0048* (2013.01); *B60R 2021/0053* (2013.01); *B60R 2021/23146* (2013.01)

(58) Field of Classification Search
CPC .. B60R 2021/23146; B60R 2021/0044; B60R 2021/0053
See application file for complete search history.

(56) References Cited

U.S. PATENT DOCUMENTS

| | | | | |
|---|---|---|---|---|
| 6,286,860 | B1* | 9/2001 | Adomeit | B60R 21/18 |
| | | | | 280/733 |
| 9,561,774 | B2* | 2/2017 | Cheng | B60R 21/239 |
| 10,933,830 | B2* | 3/2021 | Einarsson | B60R 21/261 |
| 11,167,717 | B2* | 11/2021 | Nakajima | B60R 21/2338 |
| 2004/0178614 | A1* | 9/2004 | Countryman | B60R 21/18 |
| | | | | 280/743.1 |
| 2005/0230945 | A1* | 10/2005 | Watanabe | B60R 21/18 |
| | | | | 280/733 |
| 2006/0028004 | A1* | 2/2006 | Oota | B60R 21/231 |
| | | | | 280/733 |
| 2006/0255573 | A1* | 11/2006 | Tobata | B60R 21/18 |
| | | | | 280/733 |
| 2009/0278339 | A1* | 11/2009 | Azuma | B60R 21/231 |
| | | | | 280/730.2 |
| 2015/0069741 | A1* | 3/2015 | Shimazu | B60R 21/233 |
| | | | | 280/729 |
| 2017/0129444 | A1* | 5/2017 | Fu | B60R 21/2338 |
| 2017/0355344 | A1* | 12/2017 | Choi | B60R 21/205 |
| 2019/0283702 | A1 | 9/2019 | Yamada et al. | |

FOREIGN PATENT DOCUMENTS

| | | |
|---|---|---|
| JP | 2005-297917 A | 10/2005 |
| JP | 2006-44614 A | 2/2006 |
| JP | 2015-51744 A | 3/2015 |
| JP | 2019-156349 A | 9/2019 |

OTHER PUBLICATIONS

Office Action dated Aug. 19, 2022 of Japanese Patent Application No. 2019-178714 (and English machine translation).

* cited by examiner

Schematic Sectional View at A-A

Schematic Sectional View at B-B

OCCUPANT PROTECTION SYSTEM

CROSS REFERENCE TO RELATED APPLICATIONS

The present application claims priority from Japanese Patent Application No. 2019-178712 of Tanaka et al., filed on Sep. 30, 2019, and Japanese Patent Application No. 2019-178714 of Tanaka et al., filed on Sep. 30, 2019, the entire disclosures of which are incorporated herein by reference.

BACKGROUND

1. Technical Field

The present disclosure relates to an occupant protection system for protecting a vehicle occupant sitting in a seat.

2. Description of Related Art

JP 2015-051744 A discloses, in FIGS. 7 and 8, an occupant protection system for protecting a vehicle occupant sitting in a seat. The system includes a seatbelt, and an airbag disposed in a lap belt of the seatbelt for restraining the pelvic region of the occupant. In this occupant protection system, the airbag is configured to be deployed in front of the upper body of the occupant, and includes, in the upper end region, a head protecting portion for covering the front and sides of the head of the occupant. However, the head protecting portion is configured to be deployed in proximity to the head of the occupant without leaving a space in the front and sides of the head. With this configuration, the head protecting portion may fail to protect the head adequately when the airbag is deployed in such a manner that the center in a left and right direction is not aligned with that of the upper body of the occupant.

In the above occupant protection system, the airbag further includes a pair of thigh protecting portions that protrude downwardly from left and right edges of the lower end region of the airbag and is deployable on sides of the thighs of the occupant. An upper region of the airbag provided with the head protecting portion and a lower region of the airbag provided with the thigh protecting portions are configured to form a L shaped board shape as viewed from the side at airbag deployment. With this configuration, when the occupant as restrained by the seatbelt is subjected to a force that moves his upper body largely towards his lower body, the airbag deployed between the upper body and lower body may be pushed forward by the upper body and compressed. In this case the airbag will fail to protect the upper body of the occupant adequately. Moreover, the above-mentioned patent literature has no teachings of protecting the pelvic region of the occupant by the airbag.

SUMMARY

An exemplary embodiment of the present disclosure relates to an occupant protection system for protecting an occupant sitting in a seat of a vehicle, the occupant protection system including a seatbelt that includes a lap belt for arresting a pelvic region of the occupant, an inflator, and an airbag that is formed of a sheet material having flexibility and stored in a storage in the lap belt in a folded form, the airbag being configured to be inflated and deployed upward from the storage when fed with an inflation gas from the inflator. The airbag includes, when deployed, a main inflatable portion for protecting an upper body of the occupant, and a head protecting portion that is located in a vicinity of an upper end of the main inflatable portion for protecting a head of the occupant. The head protecting portion includes a front inflatable portion for covering a front side of the head, and a pair of side inflatable portions that extend rearward from both ends in a left and right direction of the front inflatable portion for covering sides of the head, each of the side inflatable portions being configured to be deployed in such a manner that a space is formed between itself and the head.

Another exemplary embodiment of the present disclosure relates to an occupant protection system for protecting an occupant sitting in a seat of a vehicle, the occupant protection system including a seatbelt that includes a lap belt for arresting a pelvic region of the occupant, an inflator, and an airbag that is formed of a sheet material having flexibility and stored in a storage in the lap belt in a folded form, the airbag being configured to be inflated and deployed upward from the storage when fed with an inflation gas from the inflator. The airbag includes, when deployed: a central inflatable portion for protecting an upper body of the occupant; a pair of head protecting portions that protrude rearward from left and right end regions of an upper end region of the central inflatable portion for covering sides of a head of the occupant; and a pair of pelvis protecting portions that protrude rearward from left and right end regions of a lower end region of the central inflatable portion for covering sides of a pelvic region of the occupant. The central inflatable portion as fully deployed has a sufficient width for arresting generally an entirety of the upper body of the occupant in an area between the head protecting portions and pelvis protecting portions. The central inflatable portion includes a deformation preventing means for preventing the upper end region of the central inflatable portion from bending forward at receiving the upper body of the occupant.

BRIEF DESCRIPTION OF DRAWINGS

FIG. 3 is a front view of the seat of FIG. 1 with a seatbelt buckled in.

FIG. 15 is a front view of a seat on which an occupant protection system in accordance with a second exemplary embodiment is mounted, with a seatbelt bucked in.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
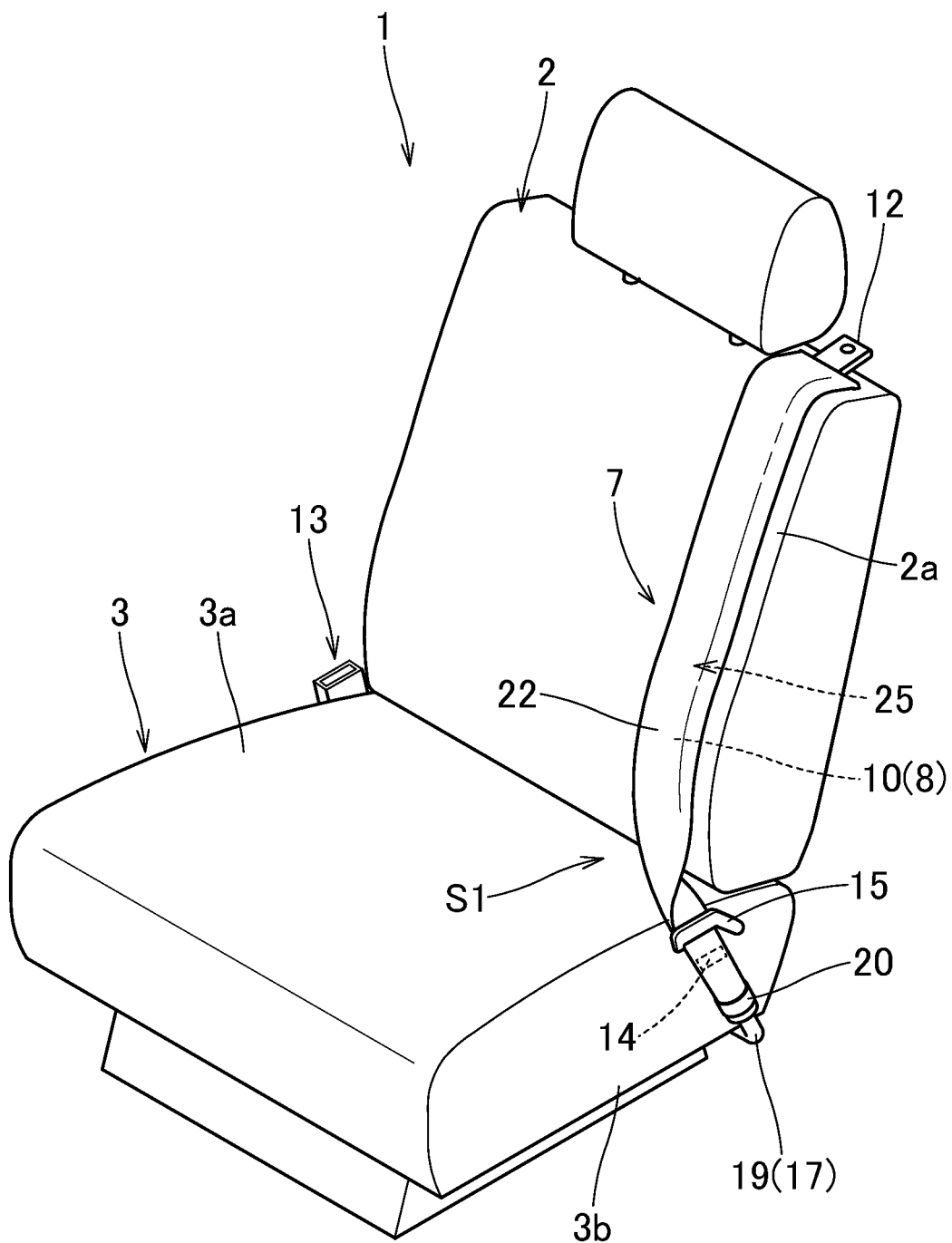
FIG. 1 is a perspective view of a seat on which an occupant protection system in accordance with a first exemplary embodiment is mounted.
Figure 2:
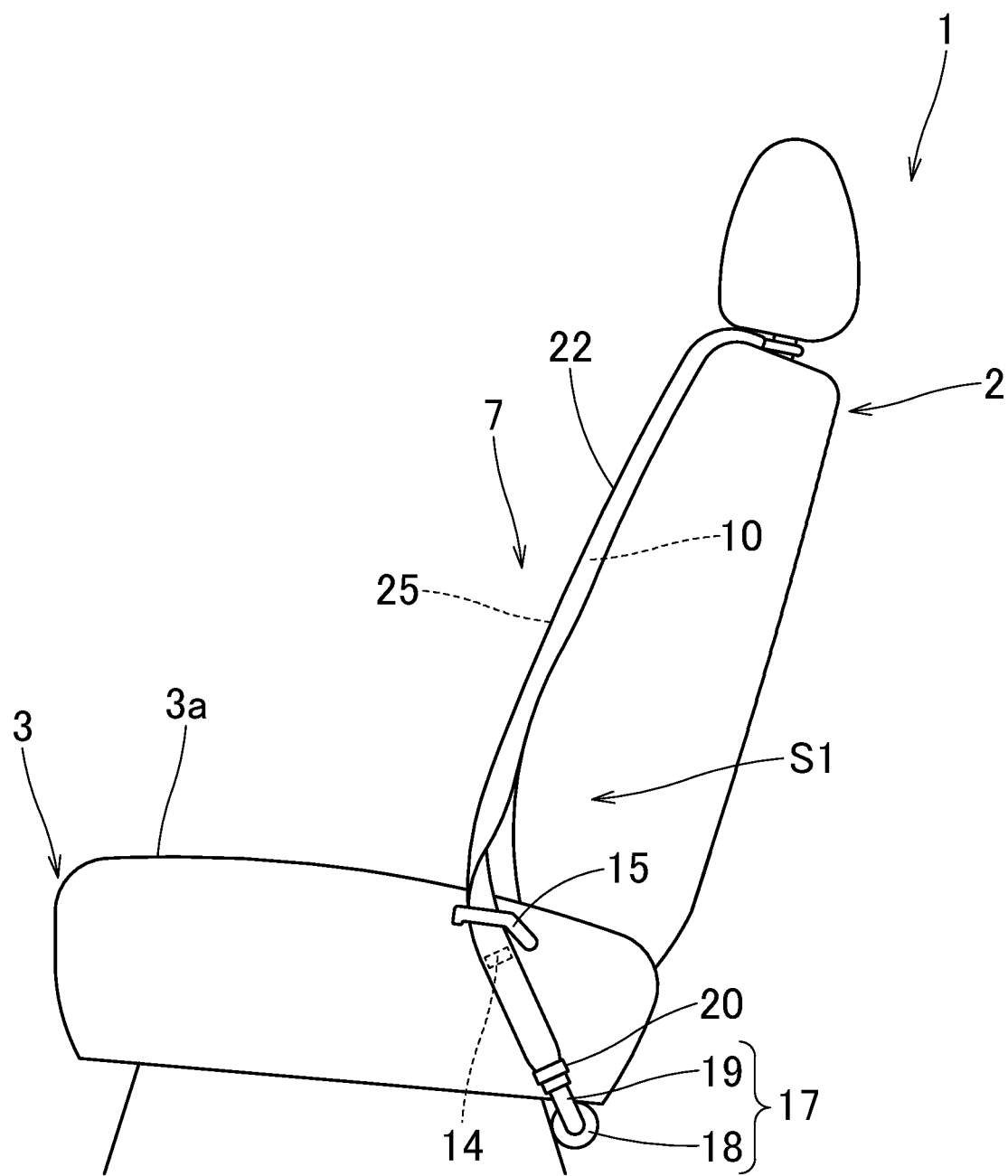
FIG. 2 is a side view of the seat of FIG. 1.
Figure 3:
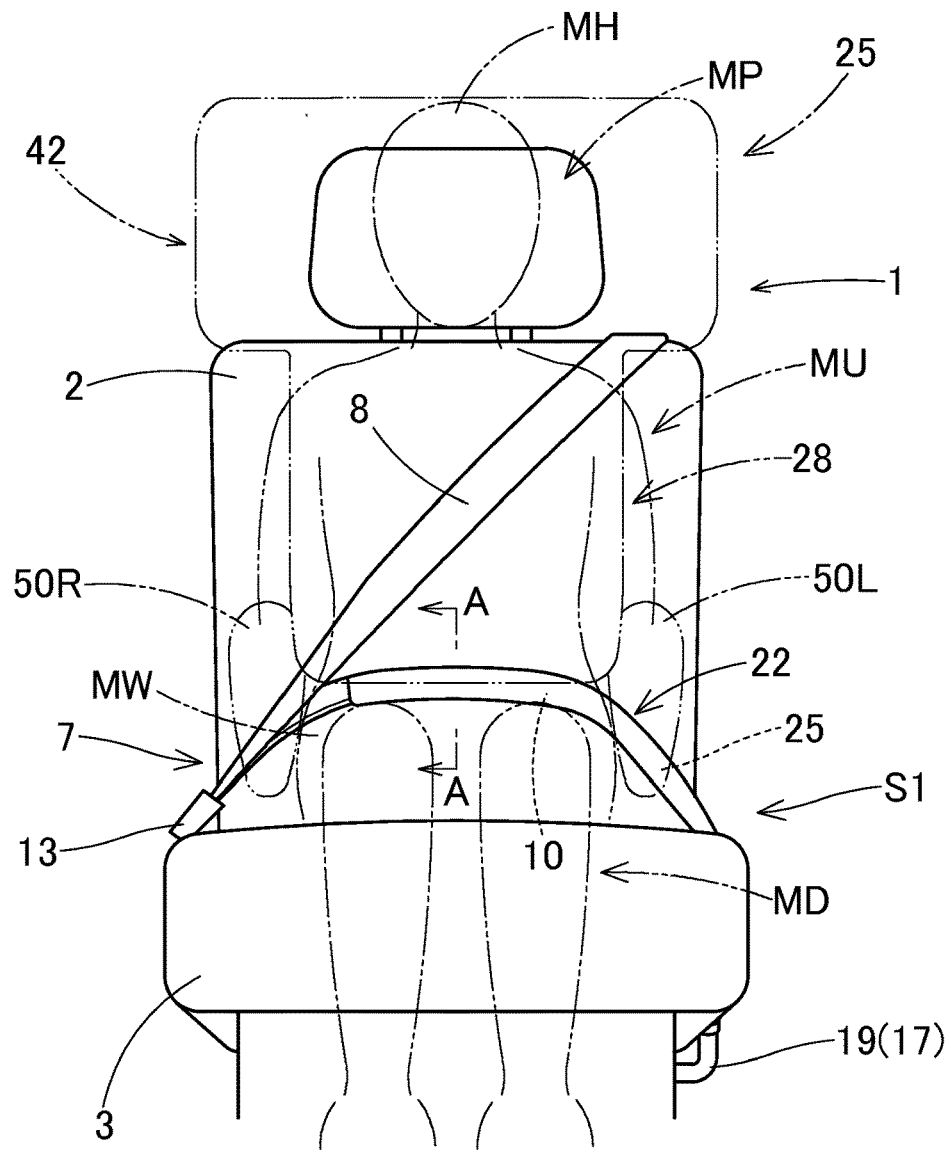
Figure 3:
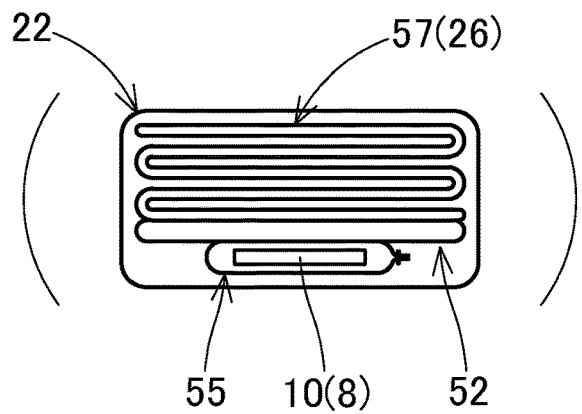
Figure 4:
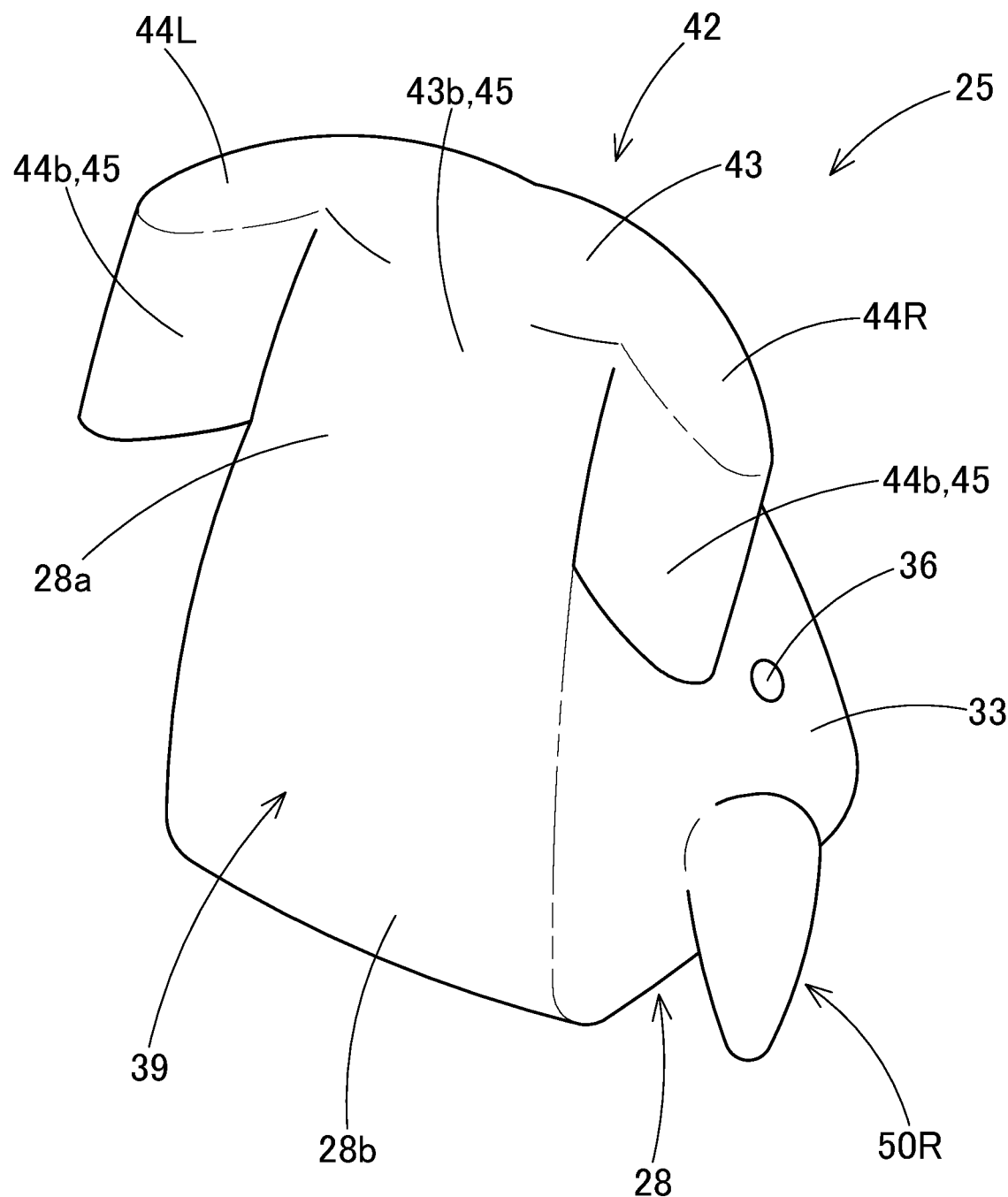
FIG. 4 is a schematic perspective view of an airbag used in the occupant protection system in accordance with the first exemplary embodiment, the airbag being inflated by itself and viewed from the back.

As shown in FIGS. 1 to 3, an occupant protection system S1 in accordance with a first exemplary embodiment is installed in a seat 1 of a vehicle, and includes a seatbelt 7, an airbag 25, and an inflator 17. The seat 1 includes a seatback 2 and a seat portion 3.

Unless otherwise specified, front and back, up and down, and left and right directions in this specification correspond to front and back, up and down, and left and right directions of the seat 1.

The seatbelt 7 includes a belt body 8 for restraining an occupant MP sitting in the seat 1, a tongue plate 12 which is attached to the belt body 8, and a buckle 13 for engagement with the tongue plate 12. A not-shown retractor is located inside of the seatback 2, and the belt body 8 is retained by a reel shaft of the retractor by the first end, and retained, by the second end, by an anchor member 14 (FIGS. 1 and 2) located in a left side of a rear end 3b region of the seat portion 3. More specifically, the belt body 8 is arranged to protrude from a left upper end portion of the seatback 2 such that a later-described lap belt 10, in which an airbag 25 is stored as will be described below, is exposed on a front surface of the backrest 2 when not worn by the occupant, as can be seen in FIGS. 1 and 2. The belt body 8 includes a lap belt 10, and a shoulder belt 9 which is stored inside of the seatback 2. When the occupant wears the seatbelt 7 by bringing the tongue plate 12 into engagement with the buckle 13, the lap belt 10 extends generally in a left and right direction between the anchor member 14 and buckle 13 and restrains the lower body MD (pelvic region MVV) of the occupant MP while the shoulder belt 9 extends diagonally from the left upper end portion of the seatback 2 to the buckle 13 and restrains the upper body MU (shoulder to thorax) of the occupant MP, as can be seen in FIG. 3. More specifically, the lap belt 10 is configured to be exposed on the front surface of the backrest 2 in a left edge region 2a of the backrest 2 and extend generally in an up and down direction, when not worn by the occupant, as can be seen in FIG. 1.

In this specific embodiment, the inflator 17 is disposed farther downward than a seat surface 3a of the seat 1. More specifically, as can be seen in FIG. 2, the inflator 17 includes a generally cylindrical inflator body 18 which is disposed beneath the seat portion 3 and in a vicinity of the back of the seat 1 in such a manner as to extend generally in a left and right direction, though not depicted in detail, and a pipe 19 which extends from the inflator body 18 for feeding the airbag 25 with an inflation gas. The pipe 19 is made from metal and extends from the inflator body 18. The leading end of the pipe 19 is located in a vicinity of a border between the seat portion 3 and seatback 2 in the left side of the seat 1, and is connected with a later-described conduit portion 52 of the airbag 25 with a clamp 20.

The airbag 25 is folded in an elongated shape, and disposed on an upper side of the lap belt 10 of the seatbelt 7 as worn by the occupant MP, as can be seen in FIG. 3. That is, the airbag 25 is disposed in a region of the lap belt 10. In the not-worn state of the seatbelt 7 as can be seen in FIG. 1, the airbag 25 is disposed on a back side of the lap belt 10 to face the seatback 2. In this specific embodiment, the airbag 25 and the lap belt 10 are wrapped by a cover 22 which is configured to break at airbag deployment, as can be seen in FIG. 3, thus the airbag 25 is integrated with the lap belt 10. That is, a void space formed between the lap belt 10 and the cover 22 constitutes a storage of the airbag 25.

As can be seen in FIGS. 4 to 9, the airbag 25 includes a bag body 26, a conduit portion 52 which is connected with the inflator 17 for feeding the bag body 26 with an inflation gas, and a mounting portion 55 which attaches the bag body 26 to the lap belt 10. The airbag 25 is made of a sheet material having flexibility. In this specific embodiment, the airbag 25 is made of a fabric woven with polyester yarns, polyamide yarns or the like.

The bag body 26 of this specific embodiment includes a main inflatable portion 28 for protecting an upper body MU of the occupant MP, a head protecting portion 42 which is disposed in a vicinity of an upper end 28a of the main inflatable portion 28, and a pair of thigh arresting portions 50L, 50R which are disposed in a vicinity of a lower end 28b of the main inflatable portion 28.

Figure 5:
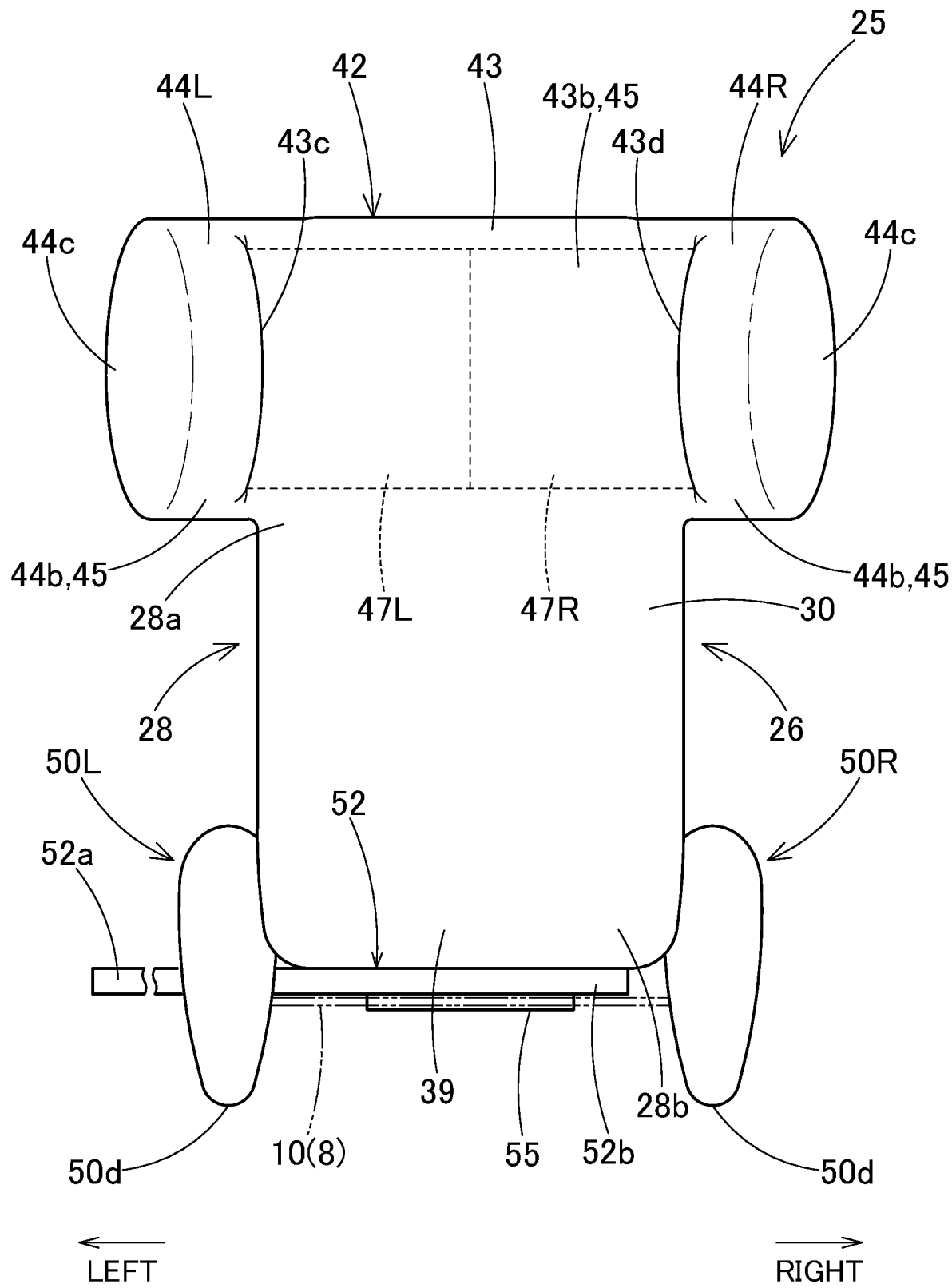
FIG. 5 is a back view of the airbag of FIG. 4.
Figure 6:
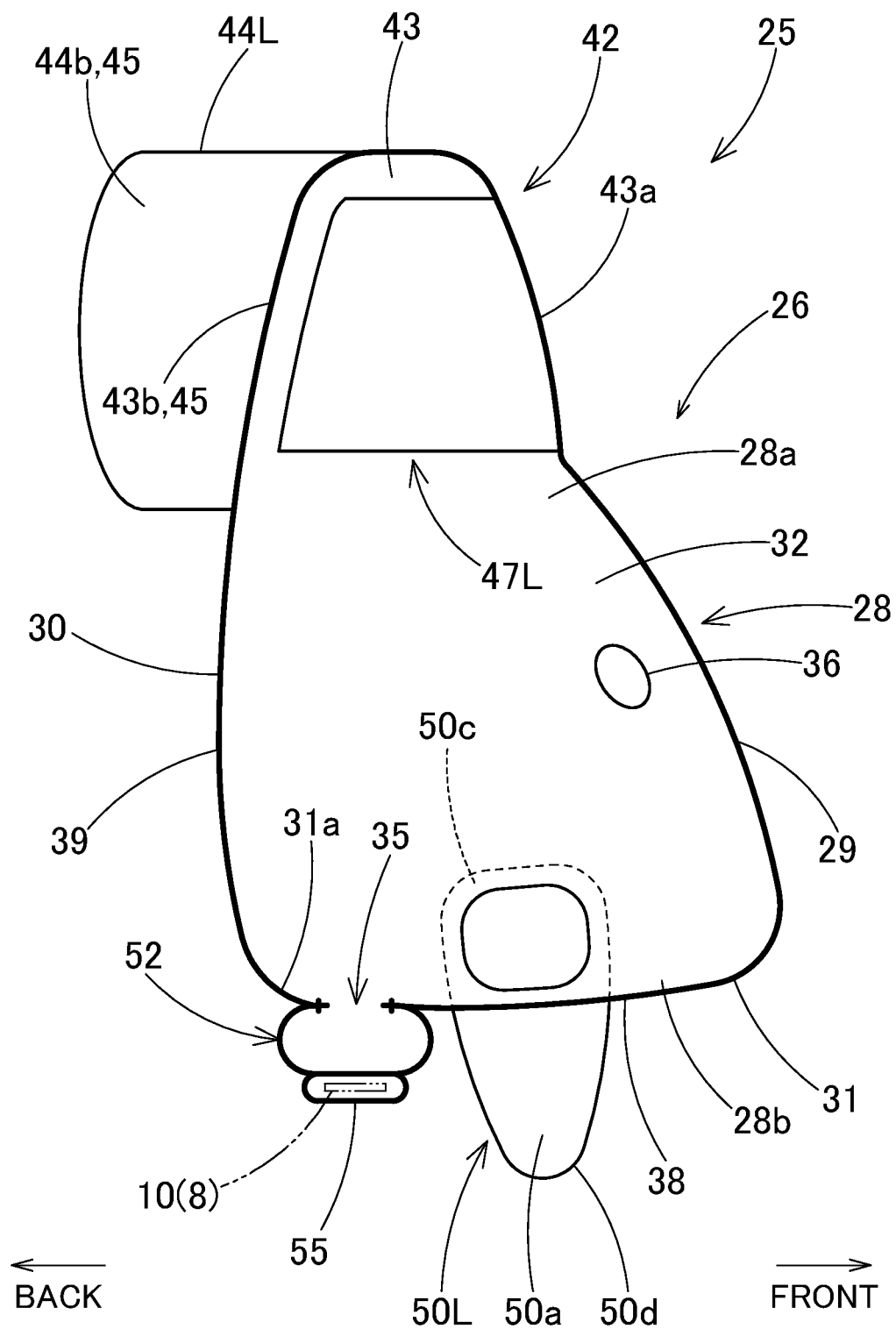
FIG. 6 is a schematic vertical sectional view of the airbag of FIG. 4 taken along a front and back direction.
Figure 8:
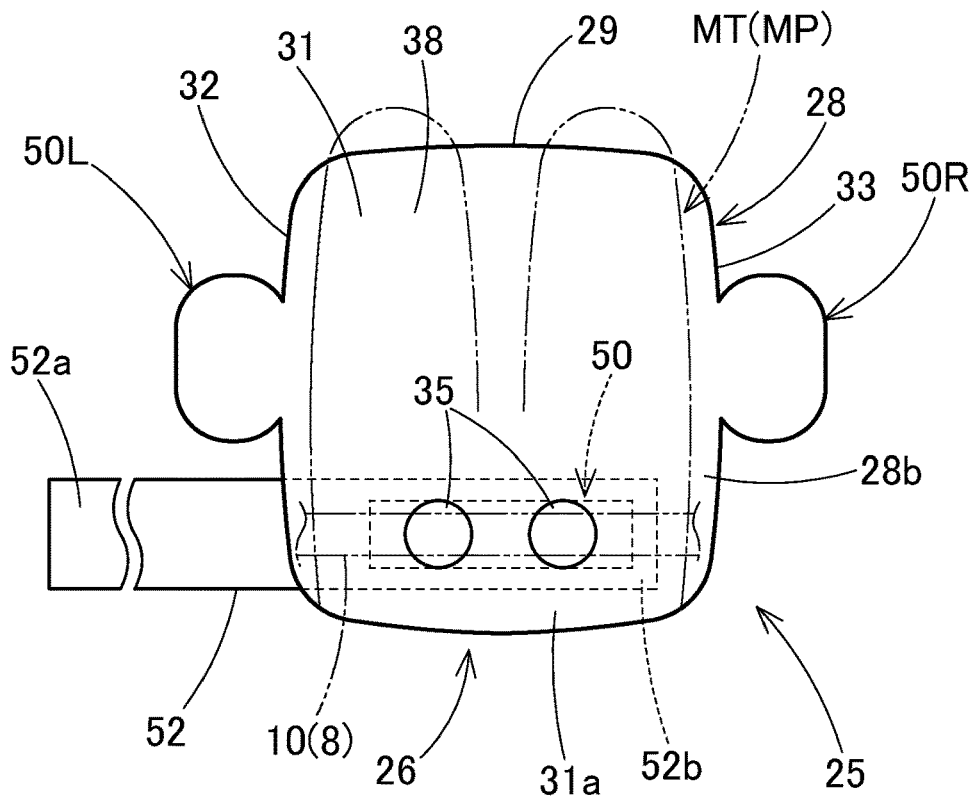
FIG. 8 is a schematic horizontal sectional view of the airbag of FIG. 4 taken at thigh arresting portions.
Figure 11:
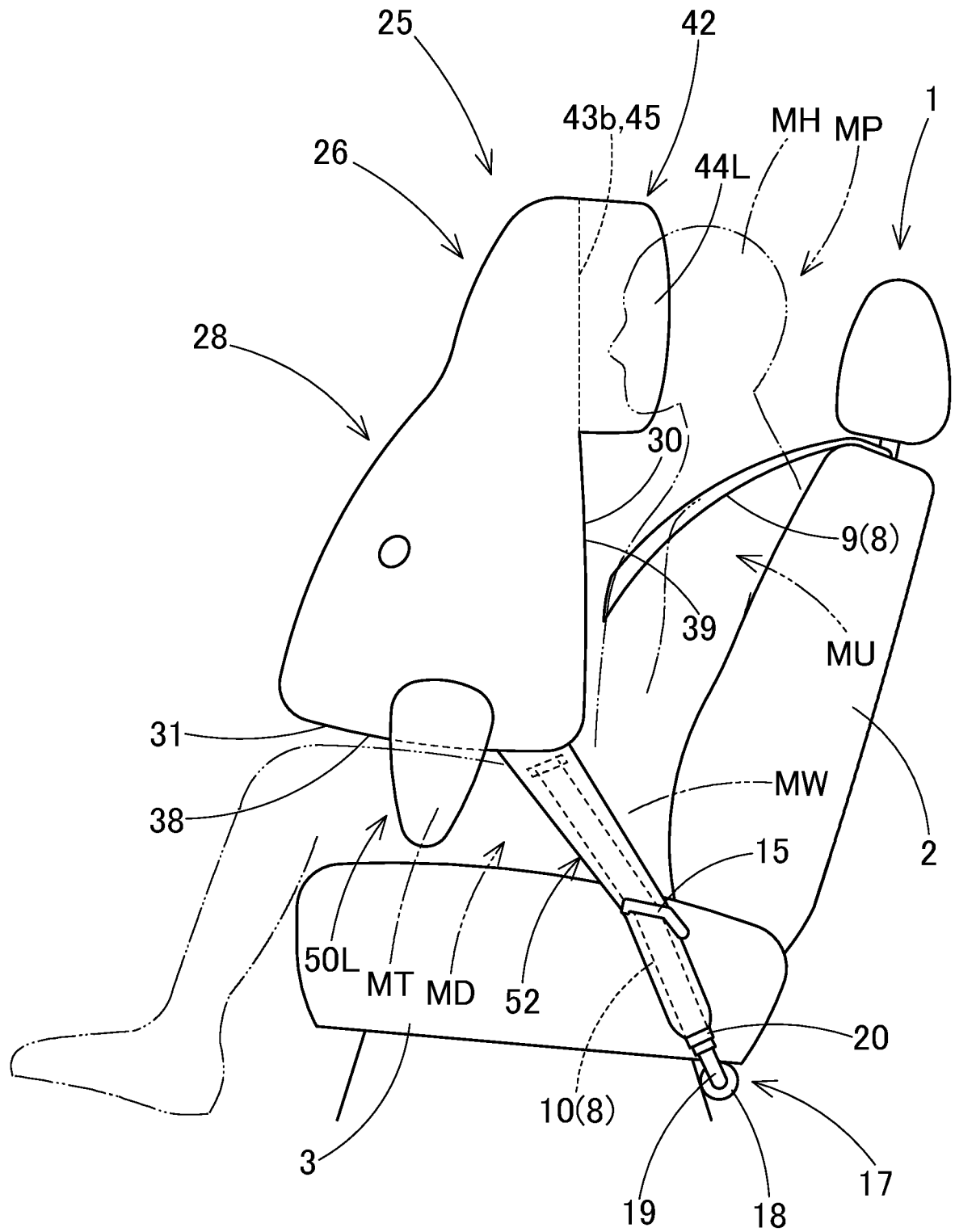
FIG. 11 is a side view of the seat at airbag deployment in the first exemplary embodiment.

The main inflatable portion 28 for protecting the upper body MU of the occupant MP is configured to be inflated into a generally triangular prism whose axis extends generally in a left and right direction. More particularly, as can be seen in FIGS. 5 and 6, the main inflatable portion 28 as fully deployed has a generally right triangular shape which has an oblique side in the front, when viewed from the side (i.e. from left or right), and has a generally rectangular shape elongated in an up and down direction when viewed from the front or back. The main inflatable portion 28 includes a front wall 29 which is configured to be deployed in the front side facing away from the occupant MP, a rear upper wall 30 and a rear lower wall 31 which are configured to be deployed towards the occupant MP, and a left wall 32 and a right wall 33 which are configured to oppose each other in the left and right direction at airbag deployment. The left wall 32 and right wall 33 are each provided with a vent hole 36 for releasing an extra inflation gas. The rear upper wall 30 constitutes an upper-body arresting surface 39 which is configured to be deployed in front of the occupant MP for arresting the upper body MU of the occupant MP. As can be seen in FIG. 11, the rear upper wall 30 (or upper-body arresting surface 39) is configured to extend generally along an up and down direction in proximity to the upper body MU of the occupant MP at airbag deployment. The rear lower wall 31 is configured to extend generally along a front and back direction, along the thighs MT of the occupant MP at airbag deployment. The main inflatable portion 28 is provided with at least one communication hole 35 which provides gas communication between the main inflatable portion 28 and the conduit portion 52, at a rear end 31a of the rear lower wall 31, so as to receive an inflation gas from the conduit portion 52, as can be seen in FIGS. 6 and 8. In the main inflatable portion 28 of this embodiment, a region of the rear lower wall 31 located farther forward than the conduit portion 52 at airbag deployment constitutes a thigh contact surface 38 which contacts with upper surfaces of the thighs MT of the occupant MP at airbag deployment. In this specific embodiment, a width in the up and down direction and a width in the left and right direction of the main inflatable portion 28 as fully inflated are set such that the rear upper wall 30 (or upper-body arresting surface 39) is able to cover generally an entirety of the upper body MU of the occupant MP except the head MH. A width in the front and back direction of the main inflatable portion 28 as fully inflated is set such that the rear lower wall 31 (or the thigh contact surface 38) is able to cover the upper surfaces of the thighs MT to a vicinity of knees.

Figure 7:
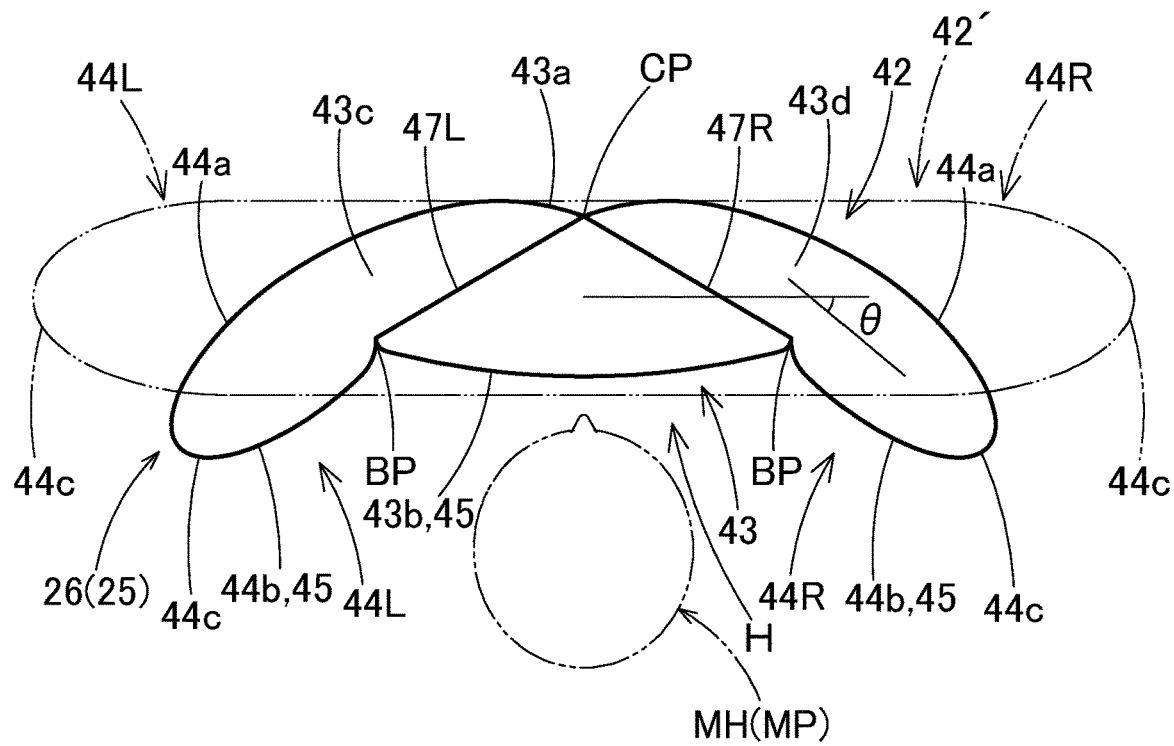
FIG. 7 is a schematic horizontal sectional end view of the airbag of FIG. 4 taken at a head protecting portion.

The head protecting portion 42 includes a front inflatable portion 43 which is deployable in front of the head MH and a pair of side inflatable portions 44L, 44R which extend rearward from a left end 43c and a right end 43d of the front inflatable portion 43. As can be seen in FIG. 6, the front inflatable portion 43 is continuous with and extends upward from the upper end 28a of the main inflatable portion 28. A width in the left and right direction of the front inflatable portion 43 is generally identical to that of the main inflatable portion 28, as can be seen in FIG. 5. The side inflatable portions 44L, 44R of this specific embodiment extend rearward from the left end 43c and right end 43d of the front inflatable portion 43 obliquely with respect to the front inflatable portion 43 such that the leading ends 44c draw farther away from each other, as can be seen in FIG. 7. The side inflatable portions 44L and 44R are generally bilaterally symmetrical in shape as fully inflated. The head protecting portion 42 is in gas communication with the main inflatable portion 28 by the lower end of the front inflatable portion 43, thus configured to receive an inflation gas via the main inflatable portion 28.

In this specific embodiment, the head protecting portion 42 is formed into a generally board shape having a generally uniform thickness from the front inflatable portion 43 to the side inflatable portions 44L, 44R, as can be seen in FIG. 7. This board shape and inclination of the side inflatable portions 44L, 44R with respect to the front inflatable portion 43 are formed by a pair of regulating tethers 47L, 47R located inside of the head protecting portion 42 for controlling the shape of the head protecting portion 42 as inflated. More specifically, the front inflatable portion 43 includes a front wall 43a and a rear wall 43b while each of the side inflatable portions 44L, 44R includes a front wall 44a and a rear wall 44b, each of which are opposed to each other in the front and back direction. As can be seen in FIG. 7, each of the regulating tethers 47L, 47R connects a center in the left and right direction of the front wall 43a of the front inflatable portion 43 and a border between the rear wall 43b of the front inflatable portion 43 and the rear wall 44b of the side inflatable portion 44L/44R (in other words, a left end 43c and a right end 43d of the rear wall 43b of the front inflatable portion 43), inside the head protecting portion 42, thus extends diagonally with respect to the left and right direction as viewed from above. Each of the regulating tethers 47L, 47R is formed of a band-shaped body whose width in an up and down direction is slightly smaller than that of the head protecting portion 42 as can be seen in FIGS. 5 and 6. The regulating tethers 47L, 47R are bilaterally symmetrical in slanted shape as viewed from above at airbag deployment. A length of each of the regulating tethers 47L, 47R is set so as to make the side inflatable portions 44L, 44R steadily slanted with respect to the front inflatable portion 43 at airbag deployment. In other words, a configuration of the head protecting portion 42 of this specific embodiment that the side inflatable portions 44L, 44R bend with respect to the front inflatable portion 43 is formed merely by locating the regulating tethers 47L, 47R inside a composing body 42 of the head protecting portion, which would have been inflatable into a flat board as indicated with dashed-and-double-dotted lines in FIG. 7, such that each of the regulating tethers 47L, 47R connects a bending point BP in a rear side (the border between the rear walls 43b, 44b) at which the side inflatable portion 44L/44R bends from the front inflatable portion 43 and a center CP in the left and right direction of the front side of the front inflatable portion 43 (i.e. the center in the left and right direction of the front wall 43a).

Figure 10:
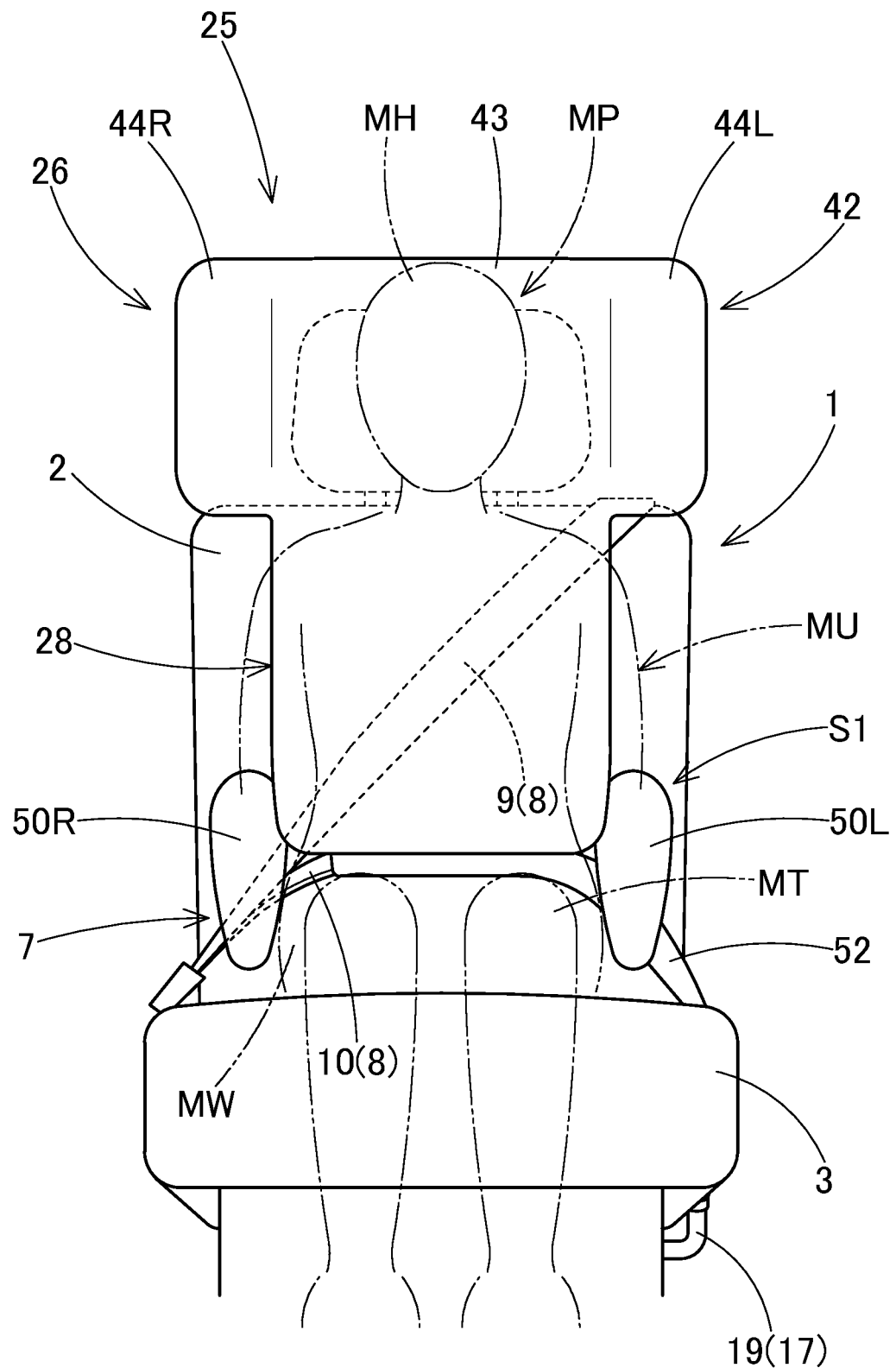
FIG. 10 is a front view of the seat at airbag deployment in the first exemplary embodiment.

To describe more specifically, the head protecting portion 42 (i.e. the front inflatable portion 43 and side inflatable portions 44L, 44R) has such a width in the up and down direction as to be able to cover generally an entirety of the head MH of the occupant MP in the up and down direction, as can be seen in FIGS. 10 and 11. An inclination angle θ (FIG. 7) of each of the side inflatable portions 44L, 44R with respect to the front inflatable portion 43 is approximately 40°, in this specific embodiment. A width in the left and right direction of each of the side inflatable portions 44L, 44R is set so as to cover a front half region of the head MH of the occupant MP sitting in the seat 1, as viewed from a side of the airbag 25 as deployed, as can be seen in FIGS. 7 and 11. In order to protect the head MH of the occupant MP when an impact is applied to the seat 1 from diagonally forward such that the occupant MP moves diagonally forward, it would be preferable that the side inflatable portions 44L, 44R are not bent considerably with respect to the front inflatable portion 43. The inclination angle θ of each of the side inflatable portions 44L, 44R with respect to the front inflatable portion 43 is thus preferably within a range of 30° to 60°.

Figure 12:
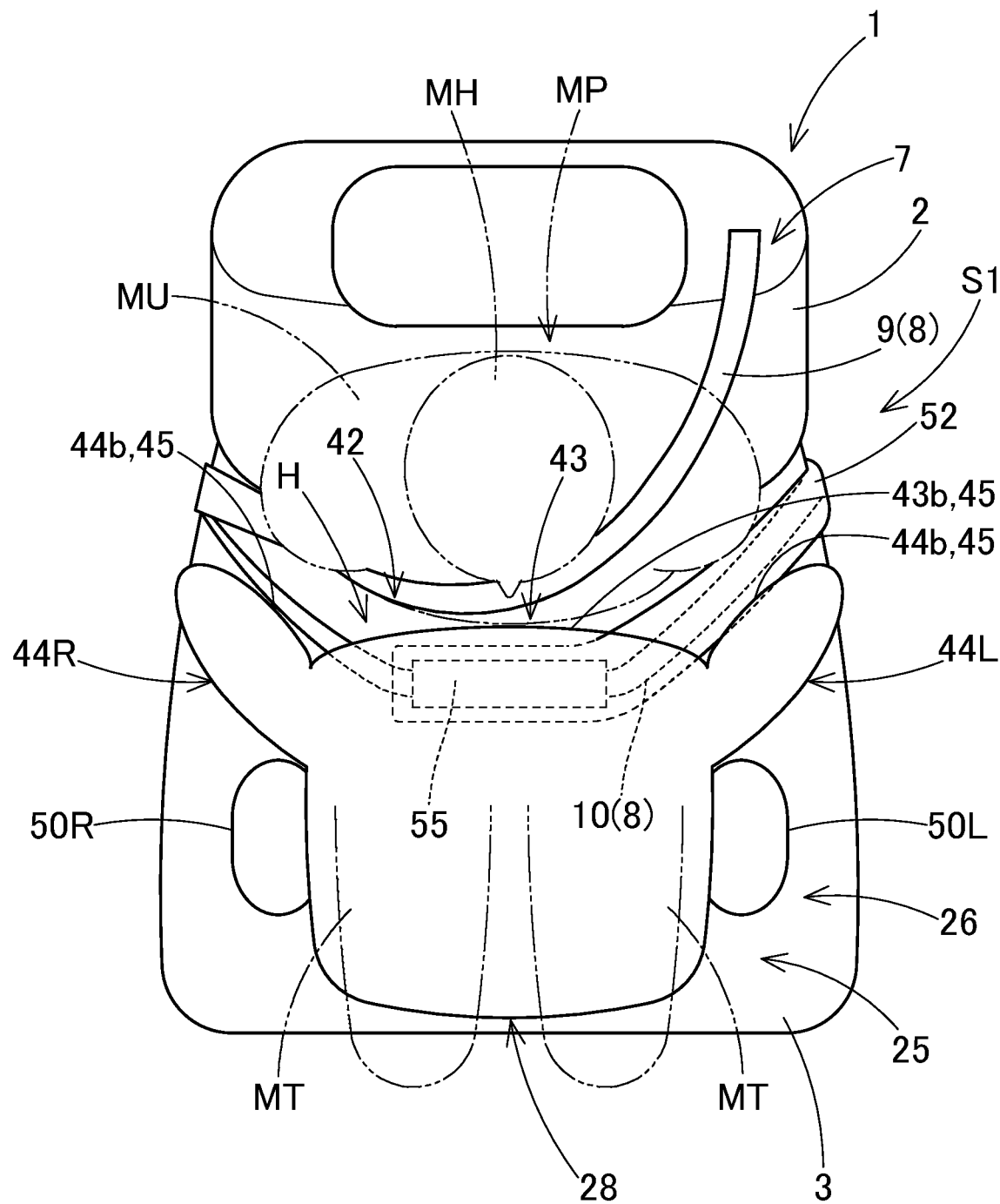
FIG. 12 is a plan view of the seat at airbag deployment in the first exemplary embodiment.

As described above, the width in the left and right direction of the front inflatable portion 43 is generally identical to that of the main inflatable portion 28, which is sufficient for covering generally an entirety of the upper body MU of the occupant MP. In other words, the front inflatable portion 43 of this specific embodiment is greater in width in the left and right direction than the head MH. Further, the side inflatable portions 44L and 44R extend from the left end 43c and right end 43d of the front inflatable portion 43 in such a manner as to draw away from each other towards the leading ends 44c (in other words, obliquely with respect to the front inflatable portion 43). That is, as can be seen in FIGS. 7, 11 and 12, the head protecting portion 42 is configured to cover the front and sides of the head MH of the occupant MP while leaving a void space H between the head MH and front inflatable portion 43 and side inflatable portions 44L, 44R (i.e. between the head MH and a head arresting surface 45 composed of the rear walls 43b, 44b), at airbag deployment. The head protecting portion 42 is provided for receiving and protecting the head MH of the occupant MP moving forward or diagonally forward in the event that an impact is applied to the seat 1 from forward or diagonally forward. A thickness of the head protecting portion 42 as fully inflated is such as to restrain the moving head MH of the occupant MP steadily.

Figure 9:
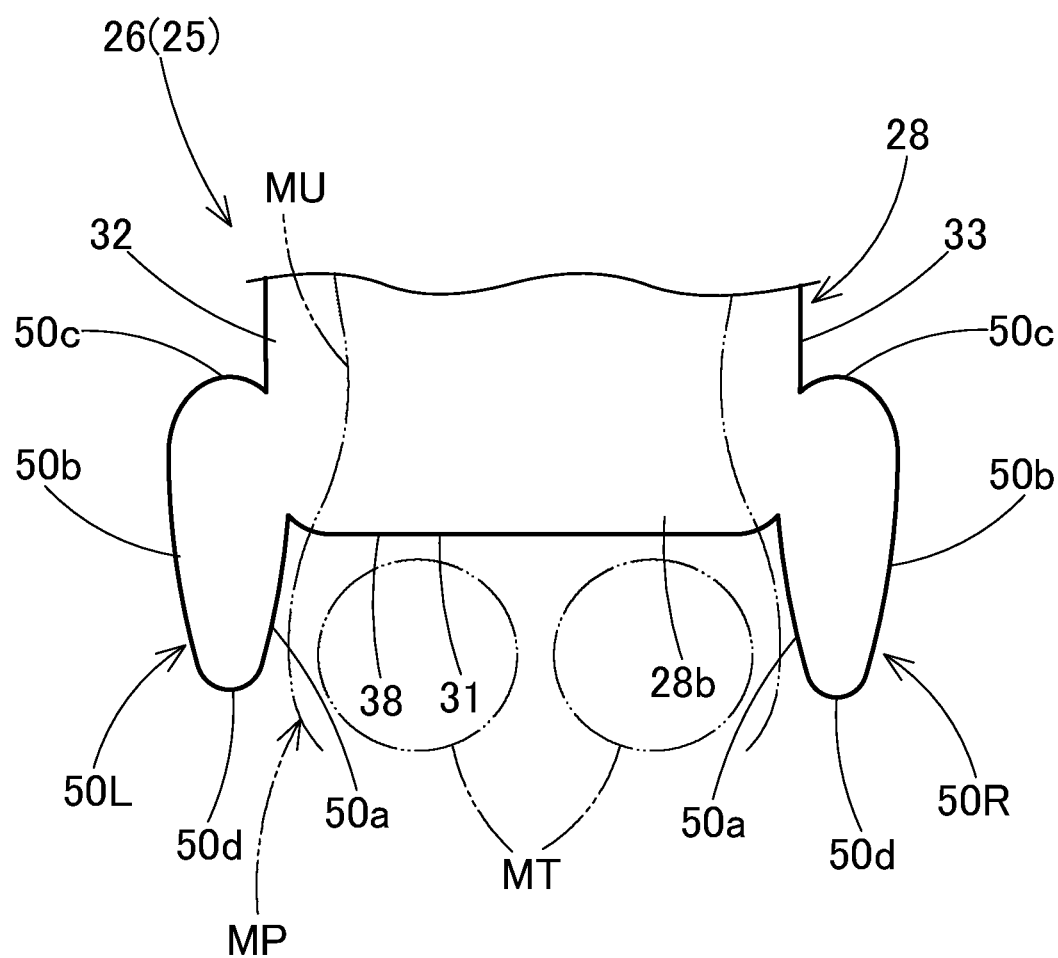
FIG. 9 is a schematic partial vertical sectional view of the airbag of FIG. 4 taken along a left and right direction at the thigh arresting portions.

The thigh arresting portions 50L, 50R protrude downwardly from left and right ends of the lower end 28b region of the main inflatable portion 28. In this specific embodiment, the thigh arresting portions 50L, 50R are identical in outer shape, and located at bilaterally symmetrical positions with respect to the center in the left and right direction of the main inflatable portion 28. As viewed from the side, each of the thigh arresting portions 50L, 50R is located generally at the center in the front and back direction of the main inflatable portion 28, as can be seen in FIG. 6. As can be seen in FIGS. 5 and 9, the thigh arresting portions 50L, 50R extend downwardly while protrude outwardly in the left and right direction from the lower end 28b region of the main inflatable portion 28. The thigh arresting portions 50L, 50R are each in communication with the main inflatable portion 28 by the upper end 50c regions, thus configured to receive an inflation gas via the main inflatable portion 28. Each of the thigh arresting portions 50L, 50R includes an inner wall 50a and an outer wall 50b which are opposed to each other in an inboard-outboard direction. To describe more specifically, each of the thigh arresting portions 50L, 50R has such a profile at airbag deployment that the width in an up and down direction is greater than the width in a front and back direction and that narrows towards the leading end (i.e. lower end 50d), as can be seen in FIG. 6. Each of the thigh arresting portions 50L, 50R as fully inflated has an outer shape that narrows towards the leading end (i.e. lower end 50d) when viewed from the front or back, too, as can be seen in FIGS. 5 and 9. Referring to FIG. 9, a distance between the root regions (or upper end 50c regions) of the thigh arresting portions 50L, 50R at airbag deployment is set to be slightly greater than a width of thighs MT of the occupant MP so that the thighs MT are disposed in a space between the thigh arresting portions 50L, 50R at airbag deployment. A width in the up and down direction of each of the thigh arresting portions 50L, 50R is so set as to cover sides of the thighs MT generally entirely.

The thigh arresting portions 50L, 50R are designed to restrain the thighs MT of the occupant MP from moving outwardly in the left and right direction in the event that an impact is applied to the seat 1 from forward or diagonally forward. To this end, a thickness of each of the thigh arresting portions 50L, 50R as fully inflated is so set as to restrain the moving thighs MT of the occupant MP steadily. The thigh arresting portions 50L, 50R also function as a position controlling member of the bag body 26 (or airbag 25) at deployment. When the main inflatable portion 28 is deployed in such a manner that its center in the left and right direction is dislocated from the center in the left and right direction of the upper body MU of the occupant MP at airbag deployment, if the inner wall 50a of one of the thigh arresting portions 50L, 50R butts a side of the thighs MT, the airbag 25 will move towards the opposite direction by a reaction force and the position of the main inflatable portion 28 will be corrected such that the center in the left and right direction of the main inflatable portion 28 and the center in the left and right direction of the upper body MU of the occupant MP are generally aligned.

The conduit portion 52 is coupled to the bag body 26 at the leading end 52b, which is closed, and connected to the pipe 19 of the inflator 17 at the root region 52a. As can be seen in FIG. 12, the conduit portion 52 is designed to extend along a left and right direction, generally along the lap belt 10 at airbag deployment. Referring to FIGS. 5, 6, and 8, the conduit portion 52 is joined to an underside of the main inflatable portion 28 of the bag body 26 as deployed by the leading end 52b region, where the afore-described communication holes 35 provide gas communication between the conduit portion 52 and main inflatable portion 28.

The mounting portion 55 which attaches the bag body 26 to the lap belt 10 is located on an underside of the leading end 52b region of the conduit portion 52. The mounting portion 55 is formed into a tube so that the lap belt 10 goes there through, and is arranged generally along the left and right direction, i.e. generally along the lap belt 10, as can be seen in FIGS. 5, 6 and 8. With the configuration that the lap belt 10 is passed through the mounting portion 55, the airbag 25 (or bag body 26) is coupled to the lap belt 10 in such a manner as to be movable relative the lap belt 10 in the left and right direction (i.e. in a length direction of the lap belt 10) to a certain degree.

When the inflator 17 of the occupant protection system S1 in accordance with the first exemplary embodiment as mounted on the vehicle is actuated, an inflation gas emitted from the inflator 17 will flow into the bag body 26 via the conduit portion 52, so that the bag body 26 will break the cover 22 and protrudes forward and upwardly from the lap belt 10, and be deployed as can be seen in FIG. 3 (with dashed-and-double-dotted lines) and FIGS. 10 to 12.

Figure 14:
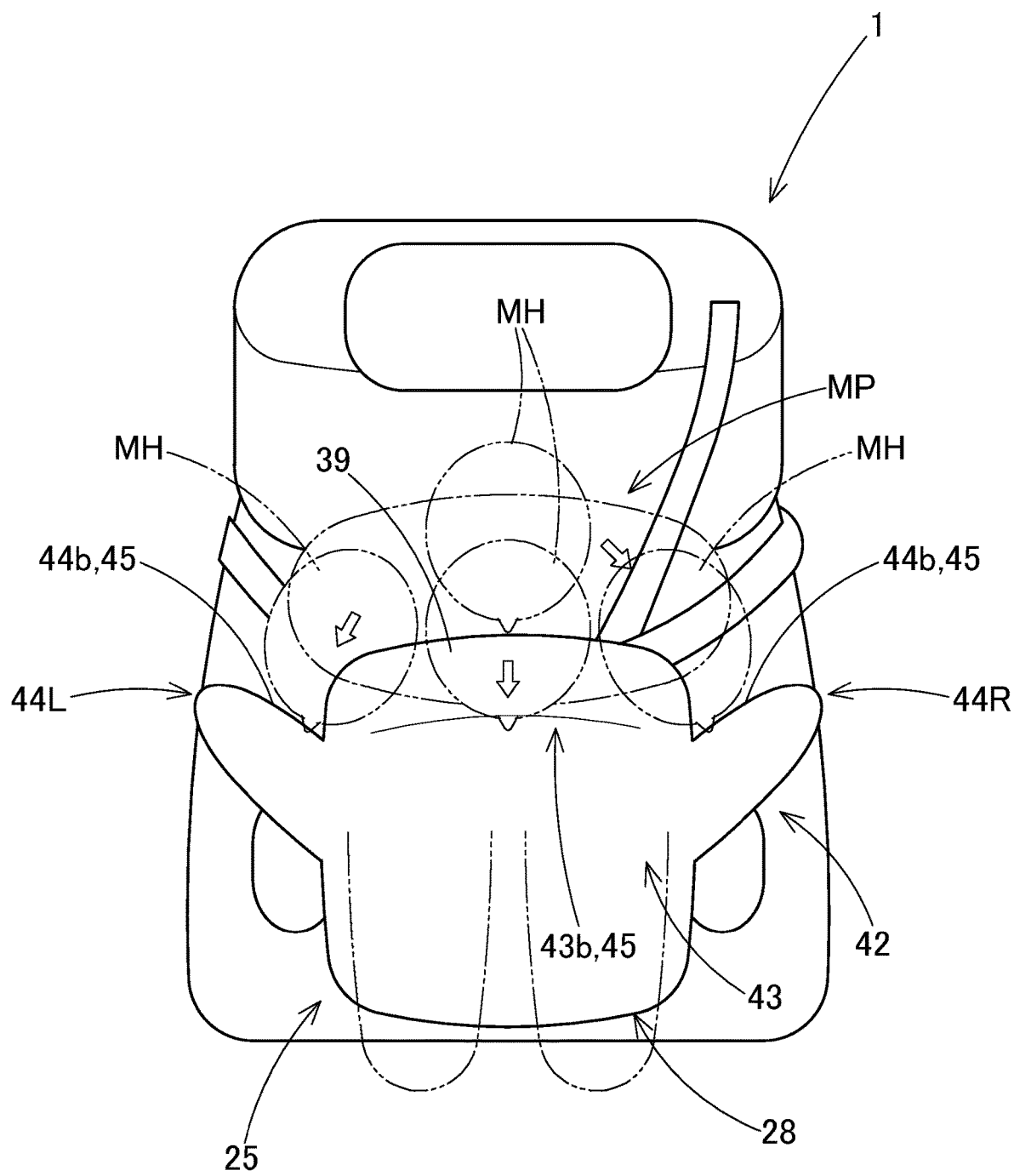
FIG. 14 is a plan view of the occupant protection system in accordance with the first exemplary embodiment depicting the way the airbag as fully deployed restrains the occupant.

In the occupant protection system S1 in accordance with the first exemplary embodiment, the head protecting portion 42 for protecting the head MH of the occupant MP includes the front inflatable portion 43 for covering a front side of the head MH, and a pair of side inflatable portions 44L, 44R that extend rearward from the left end 43c and right end 43d of the front inflatable portion 43 for covering sides of the head. Each of the side inflatable portions 44L, 44R is configured to be deployed in such a manner that a space H is formed between itself and the head MH. With this configuration, the head protecting portion 42 will be able to receive the head MH of the occupant MP, which moves forward with the upper body MU restrained by the main inflatable portion 28, in an area encircled by the side inflatable portions 44L, 44R and the front inflatable portion 43, even in the event that the airbag 25 is deployed in a slightly dislocated manner with respect to the upper body MU of the occupant MR. As a consequence, the head MH will be smoothly protected by the front inflatable portion 43 and side inflatable portions 44L, 44R (i.e. the head arresting surface 45) which are deployed in front of the head MH in an extended fashion in the left and right direction. Further, the side inflatable portions 44L, 44R will catch the head MH steadily also in the event that the head MH moves diagonally forward, as indicated with dashed-and-double-dotted lines in FIG. 14. In the meantime, the upper body MU of the occupant MP will be restrained by the main inflatable portion 28 adequately.

Therefore, the occupant protection system S1 in accordance with the first exemplary embodiment is able to protect not only the upper body MU but also the head MH of the occupant MP adequately by the airbag 25.

Figure 13:
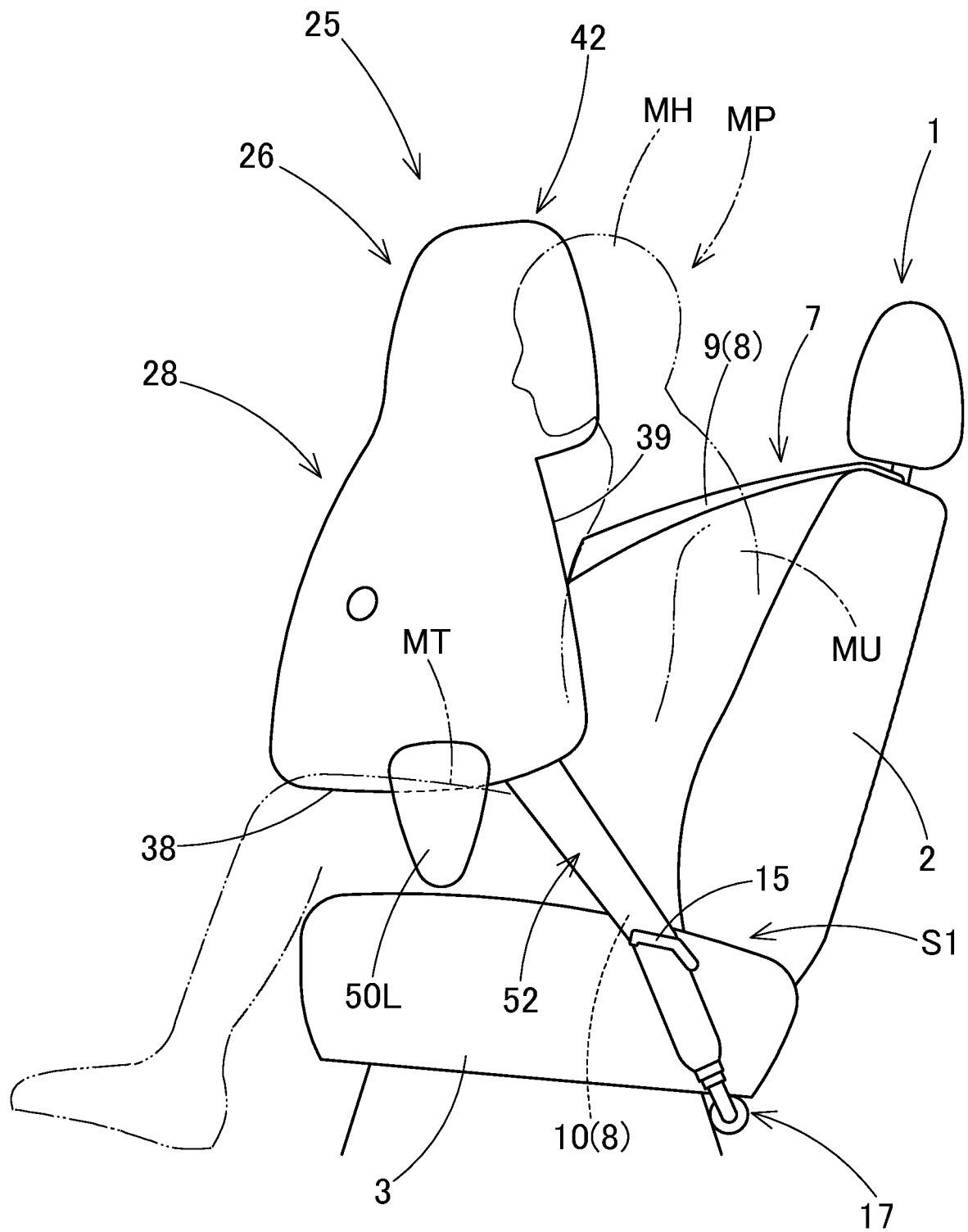
FIG. 13 is a side view of the occupant protection system in accordance with the first exemplary embodiment depicting the way the airbag as fully deployed restrains the occupant.

To describe more particularly, in the occupant protection system S1 in accordance with the first exemplary embodiment, the main inflatable portion 28 of the airbag 25 is configured to be inflated into a generally triangular prism whose axis extends generally along the left and right direction and be deployed over the front of the upper body MU of the occupant MP with the thigh contact surface 38 contacting with upper surfaces of the thighs MT. With this configuration, at airbag deployment, the thigh contact surface 38 of the main inflatable portion 28 will be supported by the thighs MT by a wide area, so that a bending of the occupant MP, i.e. a behavior of the occupant MP that the upper body MU moves towards the lower body MD, will be prevented, and the upper-body arresting surface 39 which is configured to face the occupant MP will arrest the upper body MU of the occupant MP steadily, as can be seen in FIG. 13. In the occupant protection system S1 in accordance with the first exemplary embodiment, the airbag 25 includes the head protecting portion 42 as well as the thigh arresting portions 50L, 50R for arresting the thighs MT from the left and right. By thus arresting the thighs MT with the thigh arresting portions 50L, 50R and restraining the occupant MP from moving towards the left or right, the airbag 25 will protect an entirety of the upper body MU including the head MH steadily.

In the occupant protection system S1 in accordance with the first exemplary embodiment, the thigh arresting portions 50L, 50R also function as a position controlling member of the bag body 26 (or airbag 25) at deployment. When the main inflatable portion 28 is deployed in such a manner that its center in the left and right direction is dislocated from the center in the left and right direction of the upper body MU of the occupant MP at airbag deployment, if the inner wall 50a of one of the thigh arresting portions 50L, 50R butts a side of the thighs MT, the airbag 25 will move towards an opposite direction by a reaction force and the position of the main inflatable portion 28 will be corrected such that the center in the left and right direction of the main inflatable portion 28 and the center in the left and right direction of the upper body MU of the occupant MP are generally aligned. Thus, the main inflatable portion 28 will restrain the upper body MU of the occupant MP steadily.

In the occupant protection system S1 in accordance with the first exemplary embodiment, at airbag deployment, the side inflatable portions 44L, 44R of the head protecting portion 42 extend from the front inflatable portion 43 in such a manner as to draw apart from each other towards the leading ends 44c, and disposed at a slant with respect to the front inflatable portion 43 at an angle of 30° to 60°. With this configuration, the head protecting portion 42 is able to cover an extended area in the left and right direction in front of the head MH by the front inflatable portion 43 and side inflatable portions 44L, 44R, and protect the head MH which moves diagonally forward by the side inflatable portions 44L, 44R steadily. If such advantageous effects do not have to be considered, the side inflatable portions may be configured to be deployed generally perpendicularly to the front inflatable portion, on condition that a sufficient space is formed between the head and each of the side inflatable portions.

In the occupant protection system S1 in accordance with the first exemplary embodiment, furthermore, the head protecting portion 42 includes, inside thereof, two regulating tethers 47L, 47R each of which connects the central portion CP in the left and right direction of a front side of the front inflatable portion 43 (i.e. the center in a left and right direction of the front wall 43a) and the bending point BP of the side inflatable portion 44L/44R from the front inflatable portion 43 in a rear side of the head inflatable portion 42 (i.e. the border between the rear walls 43b, 44b). That is, this simple configuration will enable the head protecting portion 42 to be inflated into such a shape that the side inflatable portions 44L, 44R bend from the front inflatable portion 43. If such an advantageous effect does not have to be considered, instead of using such tethers, the head protecting portion may be formed into a three dimensional shape in which the side inflatable portions bend with respect to the front inflatable portion by cutting base cloths of the head protecting portion into predetermined shapes and sewing circumferential edges of the base cloths together. In the first exemplary embodiment, terminals of the regulating tethers 47L, 47R are mated and joined to the front wall 43a of the front inflatable portion 43. Alternatively, the terminals of the regulating tethers may be separately joined to the front wall at a distance in a left and right direction.

An occupant protection system S2 in accordance with a second exemplary embodiment is now described referring to FIGS. 15 to 24. In a similar fashion to the occupant protection system S1 in accordance with the first exemplary embodiment, the occupant protection system S2 in accordance with the second exemplary embodiment is installed in a seat 1 of a vehicle, and includes a seatbelt 7, an airbag 125 and an inflator 17. The occupant protection system S2 has a same configuration as the occupant protection system S1 of the first exemplary embodiment except in the airbag 125. Thus, common reference numerals will be given to members common to the two embodiments, and descriptions of those members will be omitted.

Figure 15:
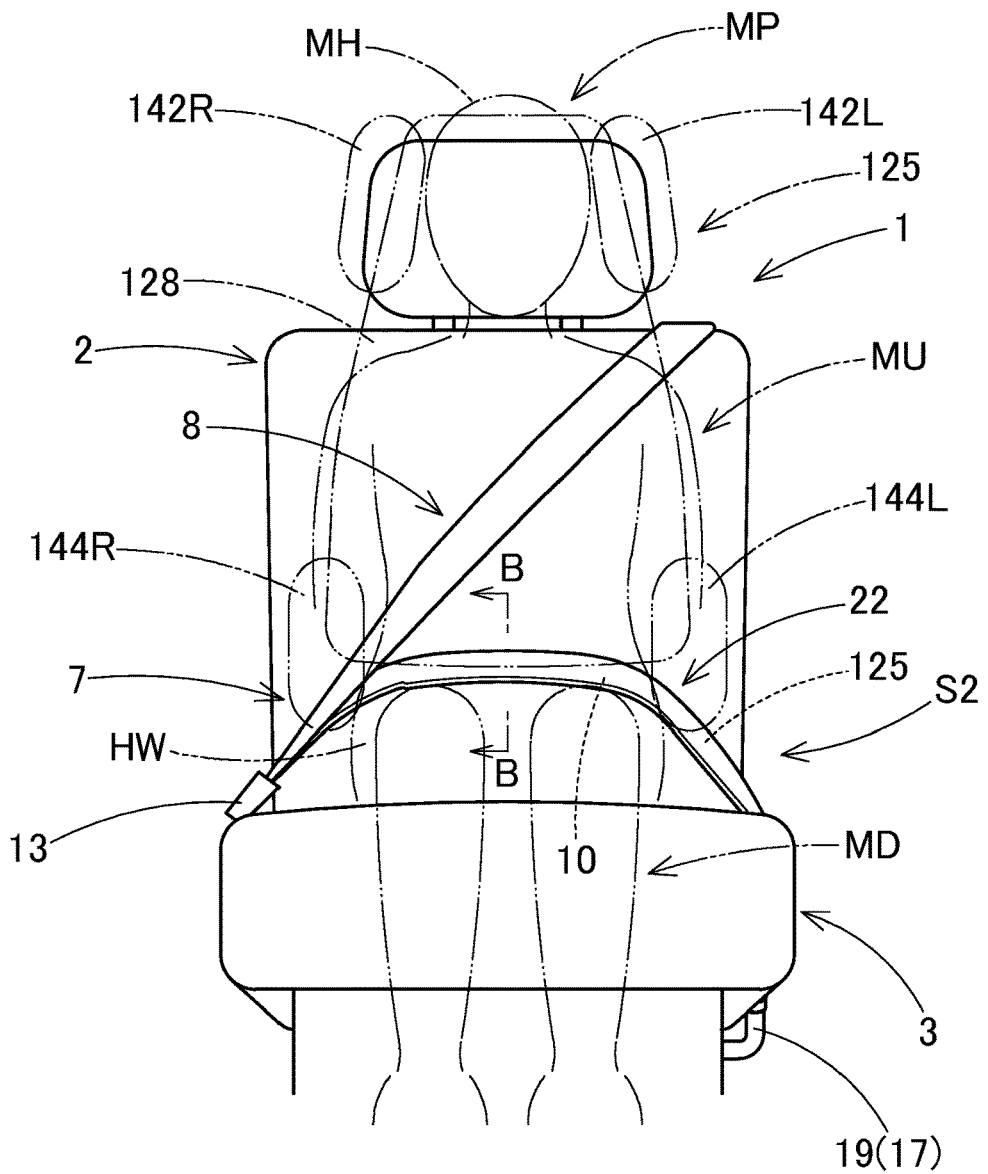
Figure 15:
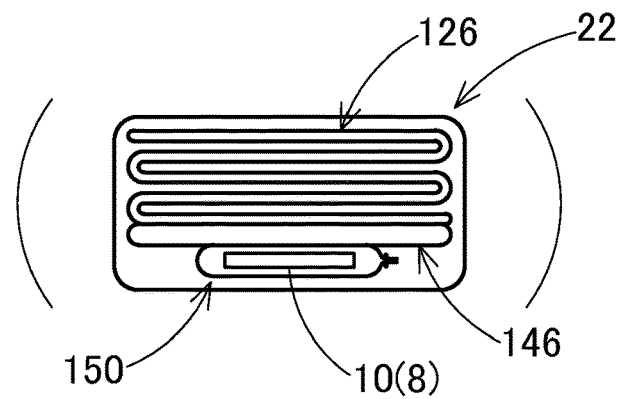

Similarly to the airbag 25 in the occupant protection system S1, the airbag 125 is folded in an elongated shape, and disposed on an upper side of the lap belt 10 of the seatbelt 7 as worn by the occupant MP, as can be seen in FIG. 15. That is, the airbag 125 is disposed in a region of the lap belt 10. The airbag 125 and the lap belt 10 are wrapped by a cover 22 which is configured to break at airbag deployment, as can be seen in FIG. 15, thus the airbag 125 is integrated with the lap belt 10. That is, a void space formed between the lap belt 10 and the cover 22 constitutes a storage of the airbag 125, in the occupant protection system S2 of the second exemplary embodiment as well.

As can be seen in FIGS. 16 to 20, the airbag 125 includes a bag body 126, a conduit portion 146 which is connected with the inflator 17 for feeding the bag body 126 with an inflation gas, and a mounting portion 150 through which the lap belt 10 is passed. The airbag 125 is made of a sheet material having flexibility. In this specific embodiment, the airbag 125 is made of a fabric woven with polyester yarns, polyamide yarns or the like.

The bag body 126 includes a central inflatable portion 128 for protecting the upper body MU of the occupant MP, a pair of head protecting portions 142L, 142R which protrude partially from the central inflatable portion 128, and a pair of pelvis protecting portions 144L, 144R which also protrude partially from the central inflatable portion 128.

Figure 17:
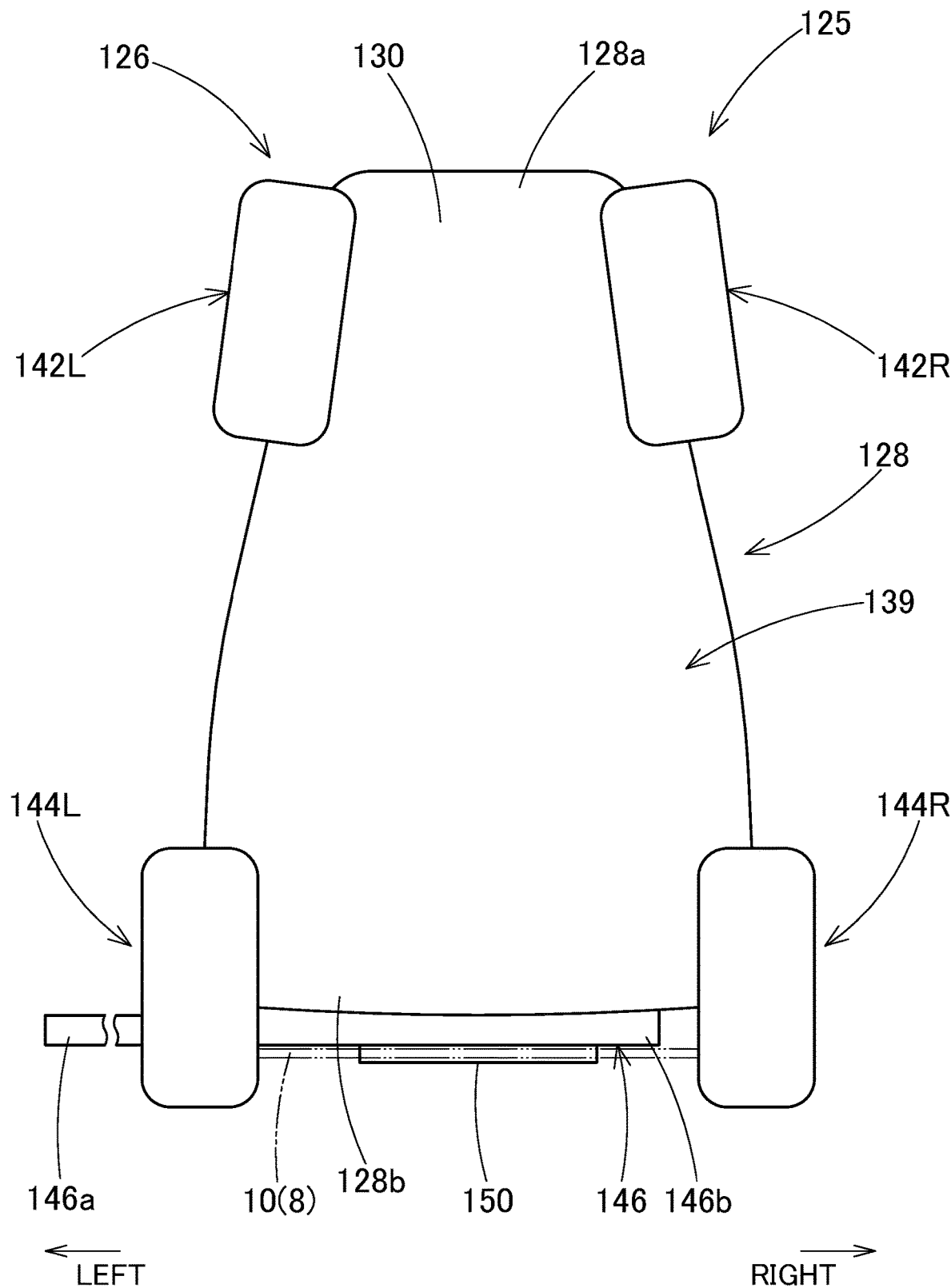
FIG. 17 is a back view of the airbag of FIG. 16.
Figure 18:
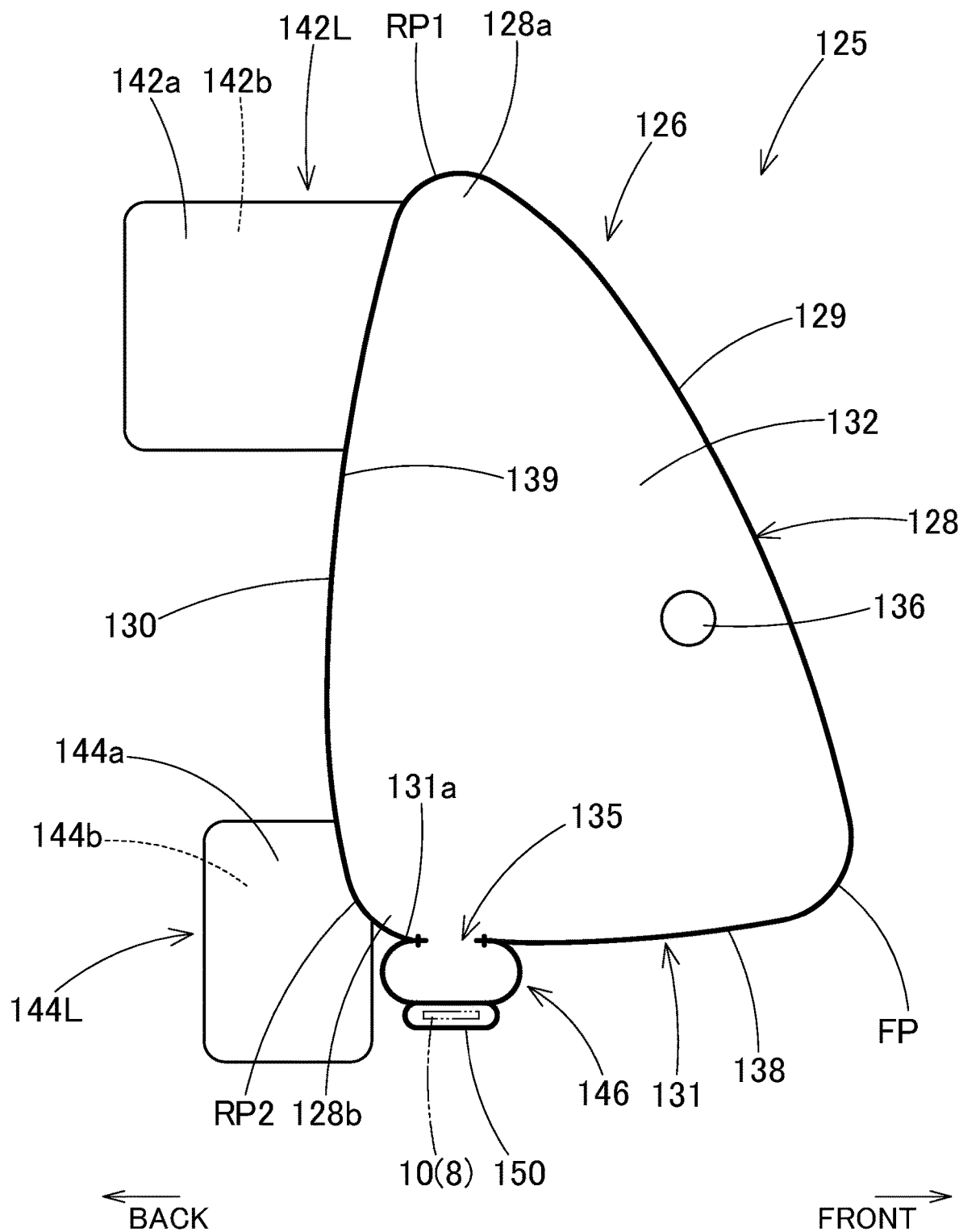
FIG. 18 is a schematic vertical sectional view of the airbag of FIG. 16.
Figure 20:
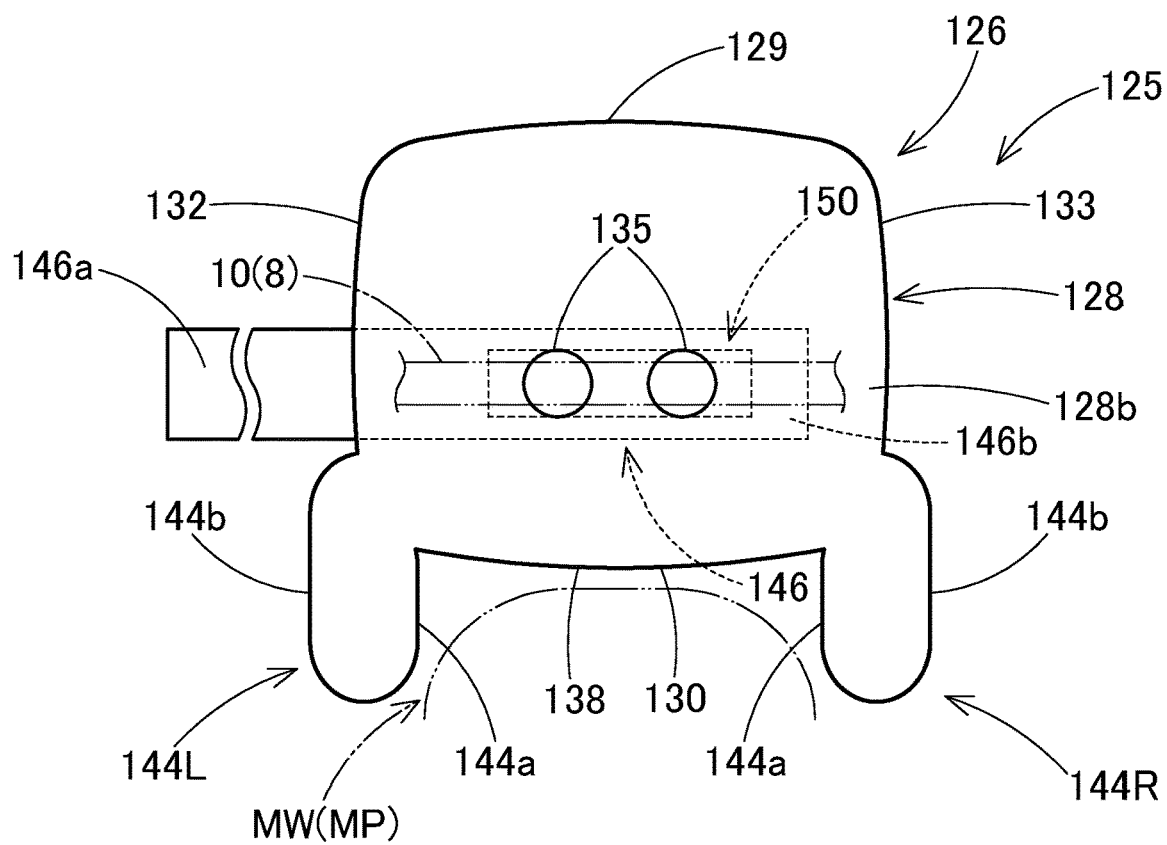
FIG. 20 is a schematic horizontal sectional view of the airbag of FIG. 16 taken at pelvis protecting portions.
Figure 22:
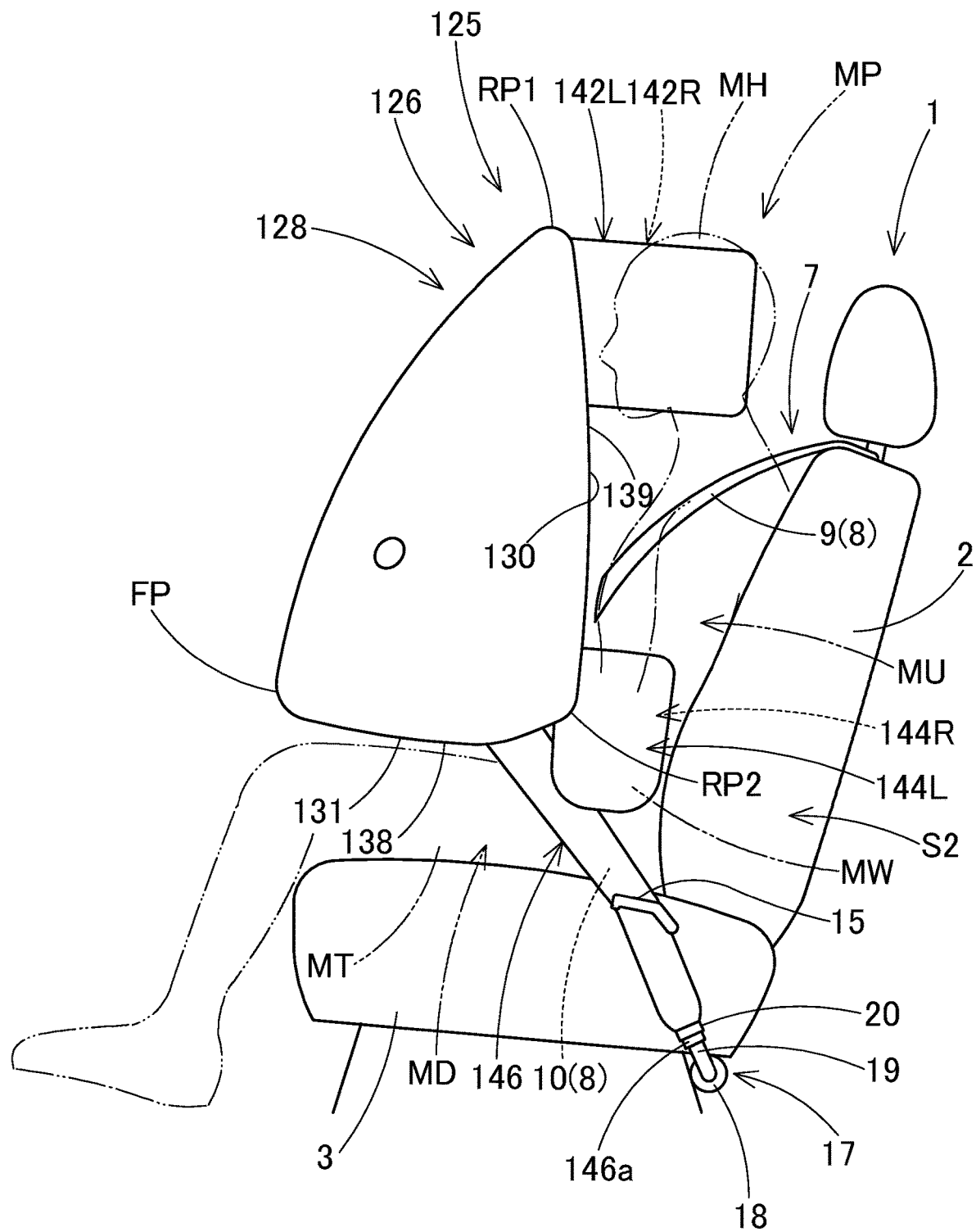
FIG. 22 is a side view of the seat at airbag deployment in the second exemplary embodiment.
Figure 23:
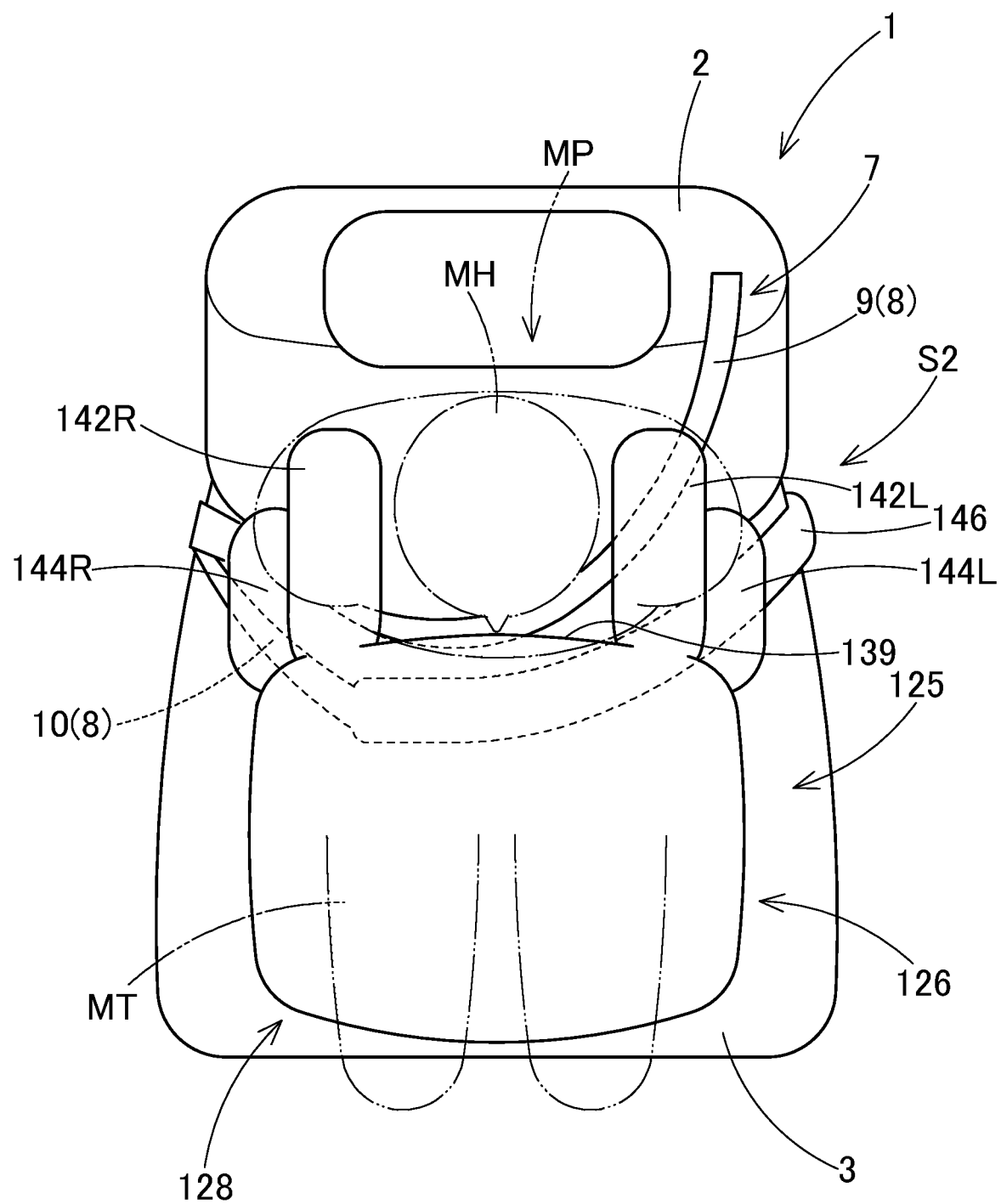
FIG. 23 is a plan view of the seat at airbag deployment in the second exemplary embodiment.
Figure 24:
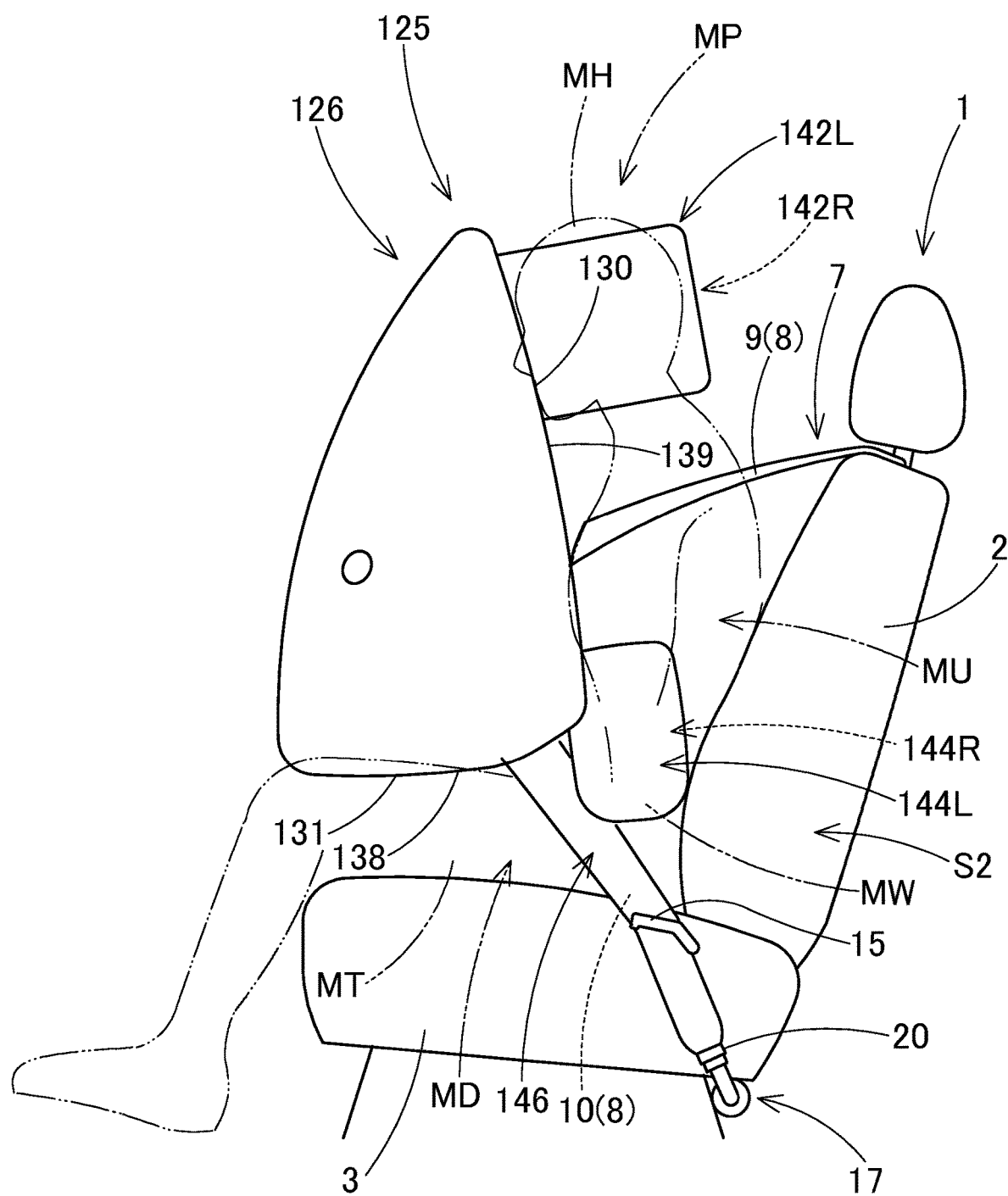
FIG. 24 is a side view of the occupant protection system in accordance with the second exemplary embodiment depicting the way the airbag as fully deployed restrains the occupant.

The central inflatable portion 128 is configured to be inflated into a generally triangular prism whose axis extends generally in a left and right direction. When viewed from the side (i.e. from left or right), the central inflatable portion 128 as fully inflated has a shape in which two apexes (rear apexes) RP1 and RP2 are located one above another in a rear side while one remaining apex (front apex) FP is located farther forward than the rear apexes RP1, RP2, as can be seen in FIGS. 18 and 22. More specifically, the central inflatable portion 128 as viewed from the side has a generally right triangular shape which has an oblique side in the front. That is, in the central inflatable portion 128 of this specific embodiment as viewed from the side, the upper rear apex RP1 is located immediately above the lower rear apex RP2, and the front apex FP1 is located in front of the rear apex RP2, as can be seen in FIGS. 18 and 22. Further, the central inflatable portion 128 has a generally trapezoidal shape which slightly widens downwardly when viewed from the front or back, as can be seen in FIG. 17, and has a generally rectangular shape when viewed from above, as can be seen in FIG. 23. The central inflatable portion 128 includes a front wall 129 which is configured to be deployed in the front side facing away from the occupant M P, a rear upper wall 130 and a rear lower wall 131 which are configured to be deployed towards the occupant MP, and a left wall 132 and a right wall 133 which are configured to oppose each other in the left and right direction at airbag deployment. The left wall 132 and right wall 133 are each provided with a vent hole 136 for releasing an extra inflation gas. The rear upper wall 130 constitutes an upper-body arresting surface 139 which is to be deployed in front of the occupant MP for restraining the upper body MU of the occupant MP. More specifically, as can be seen in FIG. 22, the rear upper wall 130 (or upper-body arresting surface 139) is configured to extend generally along an up and down direction in proximity to the upper body MU of the occupant MP at airbag deployment. The rear lower wall 131 is configured to extend generally along a front and back direction, along the thighs MT of the occupant MP at airbag deployment, as can be seen in FIG. 22. The central inflatable portion 128 is provided with at least one communication hole 135 which provides gas communication between the central inflatable portion 128 and the conduit portion 146, at a rear end 131*a* of the rear lower wall 131, so as to receive an inflation gas from the conduit portion 146, as can be seen in FIGS. 18 and 20. In the central inflatable portion 128 of this embodiment, a region of the rear lower wall 131 located farther forward than the conduit portion 146 at airbag deployment constitutes a supported surface 138 which contacts with upper surfaces of the thighs MT of the occupant MP and is supported by the thighs MT at airbag deployment, as can be seen in FIG. 24.

Figure 21:
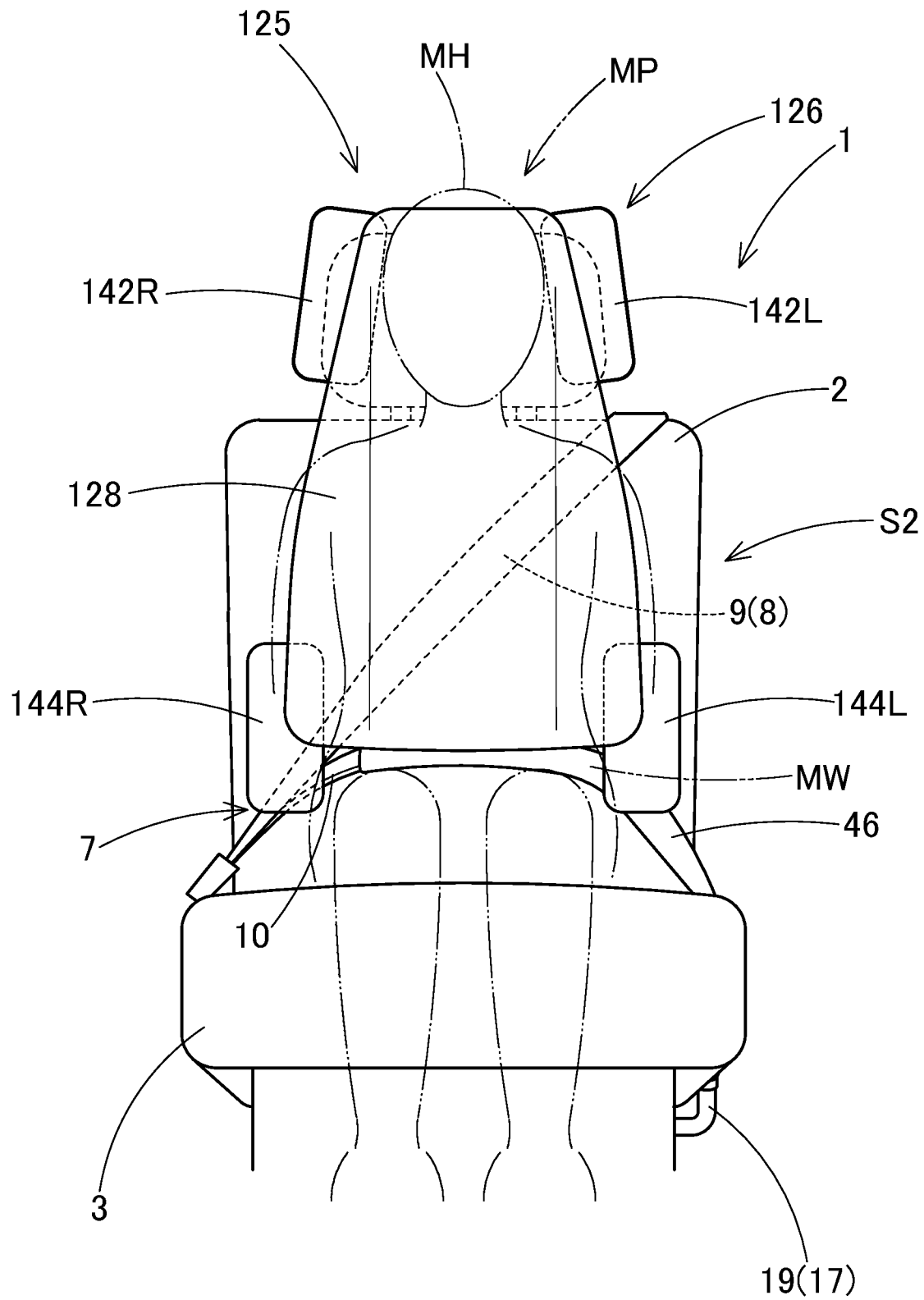
FIG. 21 is a front view of the seat at airbag deployment in the second exemplary embodiment.

A width in an up and down direction of the rear upper wall 130 of the central inflatable portion 128, i.e. the upper-body arresting surface 139, as fully inflated is such as to cover generally an entirety of the upper body MU of the occupant MP including the head MH in the up and down direction, and a width in the left and right direction of the rear upper wall 30 at airbag deployment is such as to cover generally an entirety of the upper body MU of the occupant MP in the left and right direction (more particularly, generally an entirety of the upper body MU except a part of arms as can be seen in FIG. 21, in this specific embodiment). That is, in this specific embodiment, the central inflatable portion 128 as fully inflated has a sufficient size or width for receiving generally an entirety of the upper body MU of the occupant MP in an area between the head protecting portions 142L, 142R and pelvis protecting portions 144L, 144R. The rear lower wall 131 of the central inflatable portion 128 (i.e. the supported surface 138) as fully inflated has a sufficient width in the front and back direction for covering the upper surfaces of the thighs MT of the occupant MP to a vicinity of knees, as can be seen in FIG. 22. In the airbag 125 of this embodiment, the generally triangular prism shape whose axis extends generally in the left and right direction of the central inflatable portion 128 as fully inflated constitutes a means for preventing an upper end 128*a* region of the central inflatable portion 128 from bending forward at receiving the upper body MU of the occupant MP, namely, a deformation preventing means. More specifically, since the central inflatable portion 128 is configured to be inflated into a generally triangular prism and fill a space between the lower body MD (thighs MT) and upper body MU (thorax MB and head MH) of the occupant MP at airbag deployment, the rear upper wall 130 as has caught the upper body MU will be prevented from collapsing towards the rear lower wall 131 as deployed in a vicinity of the lower body MD even in the event that the occupant MP is subjected to a force that moves the upper body MU largely towards the lower body MD. As a consequence, a bending deformation of the central inflatable portion 128 will be prevented, and the upper body MU of the occupant MP will be restrained by the central inflatable portion 128 steadily.

Figure 16:
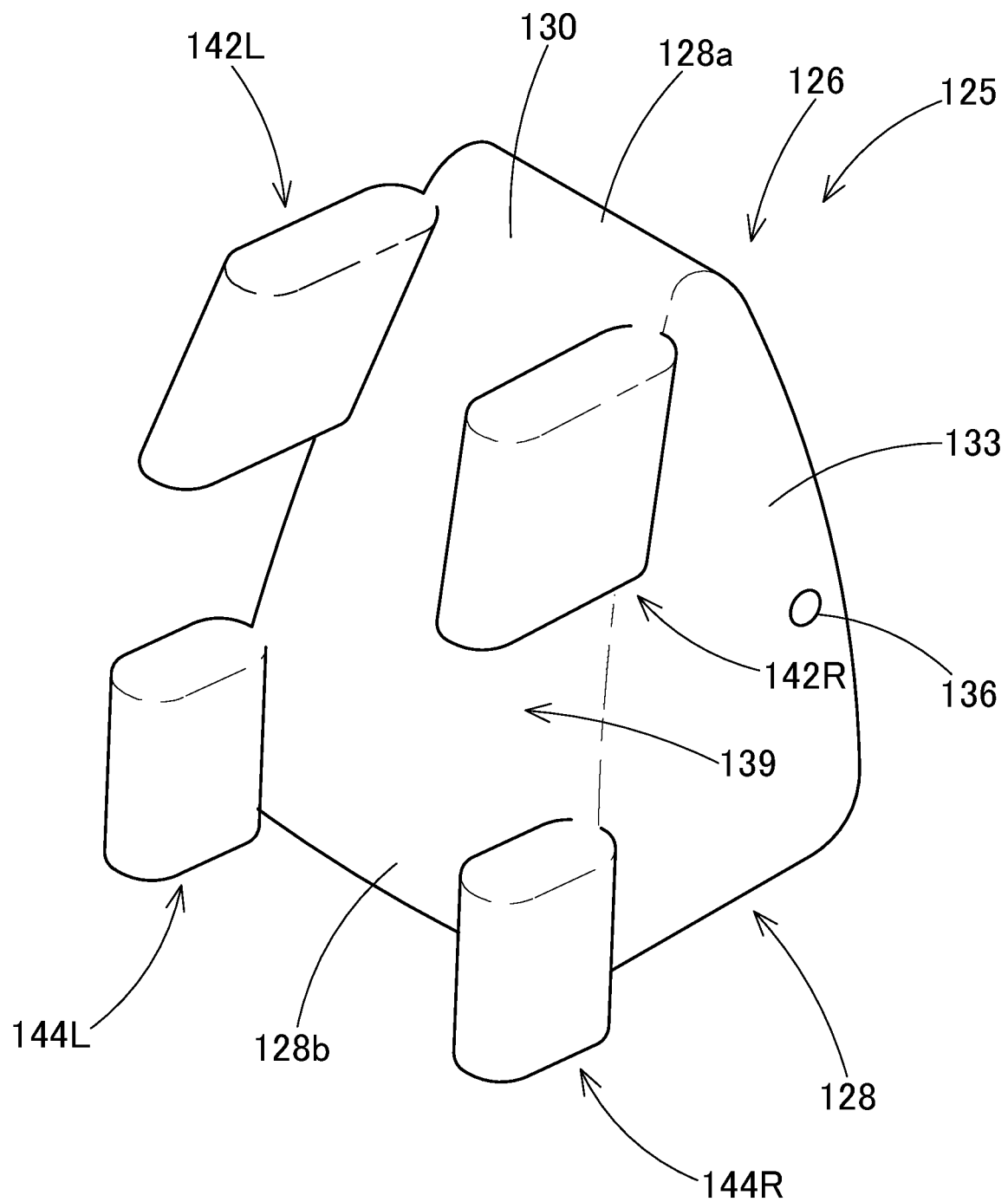
FIG. 16 is a schematic perspective view of an airbag used in the occupant protection system in accordance with the second exemplary embodiment, the airbag being inflated by itself and viewed from the back.
Figure 19:
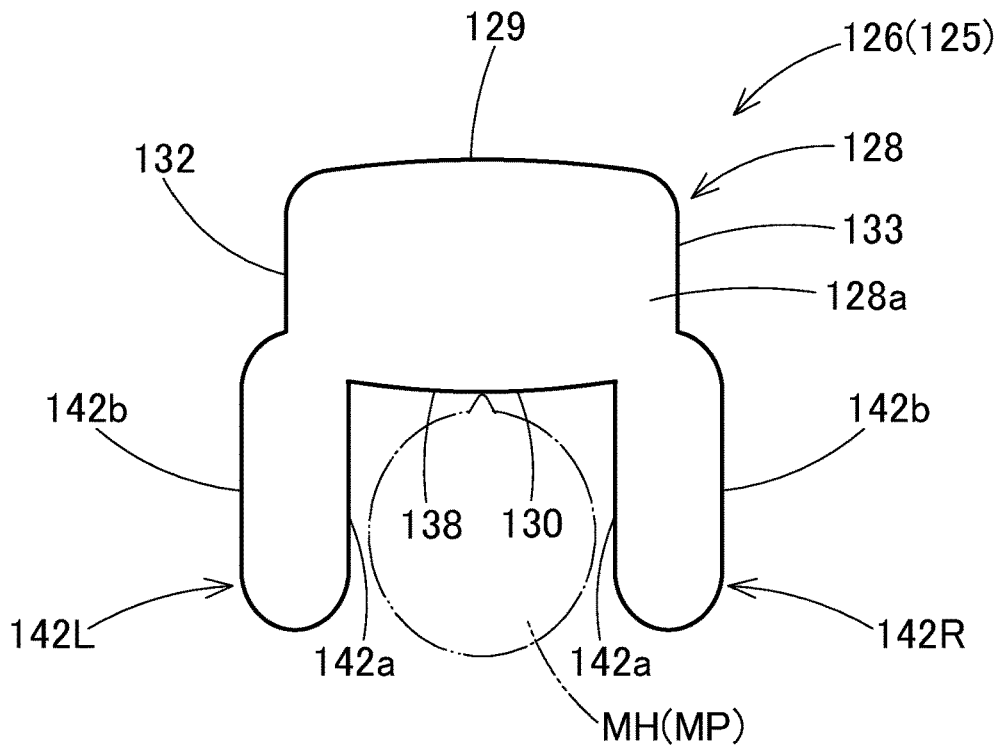
FIG. 19 is a schematic horizontal sectional end view of the airbag of FIG. 16 taken at head protecting portions.

The head protecting portions 142L, 142R are configured to cover sides of the head MH of the occupant MP in proximity to the head MH at airbag deployment. The head protecting portions 142L, 142R protrude rearward from left and right end regions of the upper end 128*a* region of the central inflatable portion 128, as can be seen in FIGS. 19 and 21. In other words, the head protecting portions 142L, 142R protrude rearward from left and right end regions of an upper end region of the upper-body arresting surface 139 (i.e. the rear upper wall 130). As can be seen in FIG. 19, each of the head protecting portions 142L, 142R is in gas communication with the central inflatable portion 128 by the front end region, thus configured to receive an inflation gas via the central inflatable portion 128. The head protecting portions 142L, 142R are generally identical in outer shape. Each of the head protecting portions 142L, 142R includes an inner wall 142*a* and an outer wall 142*b* which are opposed to each other in an inboard-outboard direction. As can be seen in FIGS. 16 and 18, each of the head protecting portions 142L, 142R as fully inflated has a generally rectangular board shape whose width in a front and back direction is greater than the width in an up and down direction. As can be seen in FIG. 22, the head protecting portions 142L, 142R are configured to cover left and right sides of the head MH of the occupant MP generally entirely in the front and back direction and up and down direction. The head protecting portions 142L, 142R are provided for receiving and protecting the head MH of the occupant MP moving outwardly in the left and right direction or diagonally forward in the event that an impact is applied to the seat 1 from the side or diagonally forward. To this end, a thickness of each of the head protecting portions 142L, 142R as fully inflated is such as to restrain the moving head MH of the occupant MP steadily.

The pelvis protecting portions 144L, 144R are configured to cover sides of the pelvic region MW of the occupant MP in proximity to the pelvic region MW at airbag deployment. The pelvis protecting portions 144L, 144R protrude rearward from left and right end regions of a lower end 128*b* region of the central inflatable portion 128, as can be seen in FIGS. 20 and 21. That is, the pelvis protecting portions 144L, 144R protrude rearward from left and right end regions of the lower end region of the upper-body arresting surface 139 (i.e. the rear upper wall 130). More specifically, the pelvis protecting portions 144L, 144R of this specific embodiment protrude not only rearward but also downwardly from a lower end region of the rear upper wall 130. As can be seen in FIG. 20, each of the pelvis protecting portions 144L, 144R is in gas communication with the central inflatable portion 128 by the front end region, thus configured to receive an inflation gas via the central inflatable portion 128. The pelvis protecting portions 144L, 144R are generally identical in outer shape. Each of the pelvis protecting portions 144L, 144R of this specific embodiment includes an inner wall 144a and an outer wall 144b which are opposed to each other in an inboard-outboard direction. As can be seen in FIGS. 16 and 18, each of the pelvis protecting portions 144L, 144R as fully inflated has a generally rectangular board shape whose width in an up and down direction is greater than a width in a front and back direction. As can be seen in FIG. 22, the pelvis protecting portions 144L, 144R are configured to cover left and right sides of the pelvic region MW of the occupant MP widely in the up and down direction at airbag deployment. The pelvis protecting portions 144L, 144R are configured to be deployed on outsides of the lap belt 10 as restraining the pelvic region MW of the occupant MP at airbag deployment as can be seen in FIGS. 21 and 22. A rearward protruding amount of the pelvis protecting portions 144L, 144R as viewed from the side is smaller than that of the head protecting portions 142L, 142R. The pelvis protecting portions 144L, 144R are designed to restrain the pelvic region MW of the occupant MP from moving outwardly in the left and right direction in the event that an impact is applied to the seat 1 from the side or diagonally forward. To this end, a thickness of each of the pelvis protecting portions 144L, 144R as fully inflated is so set as to restrain the pelvic region MW of the moving occupant MP steadily.

The conduit portion 146 is coupled to the bag body 126 at the leading end 146b, which is closed, and connected to the pipe 19 of the inflator 17 at the root region 146a. As can be seen in FIG. 23, the conduit portion 146 is designed to extend along a left and right direction, generally along the lap belt 10, at airbag deployment. Referring to FIGS. 17, 18, and 20, the conduit portion 146 is joined to an underside of the central inflatable portion 128 of the bag body 126 as deployed by the leading end 146b region, where the aforedescribed communication holes 135 provide gas communication between the conduit portion 146 and central inflatable portion 128.

The mounting portion 150 is joined to an underside of the conduit portion 146. The mounting portion 150 is formed into a tubular shape so that the lap belt 10 goes there through, and is arranged generally along the left and right direction, i.e. generally along the lap belt 10, as can be seen in FIGS. 17, 18 and 20. With the configuration that the lap belt 10 is passed through the mounting portion 150, the airbag 125 is coupled to the lap belt 10 in such a manner as to be movable relative the lap belt 10 in the left and right direction to a certain degree.

When the inflator 17 of the occupant protection system S2 in accordance with the second exemplary embodiment as mounted on the vehicle is actuated, an inflation gas emitted from the inflator 17 will flow into the bag body 126 via the conduit portion 146, so that the bag body 126 will break the cover 22 and protrudes forward and upwardly from the lap belt 10, and be deployed as can be seen in FIG. 15 (with dashed-and-double-dotted lines) and FIGS. 21 to 23.

In the occupant protection system S2 in accordance with the second exemplary embodiment, the airbag 125 includes, in the lower end 128b region of the central inflatable portion 128 for protecting the upper body MU of the occupant MP, a pair of pelvis protecting portions 144L, 144R that cover left and right sides of the pelvic region MW of the occupant MP and protect the pelvic region MW. The pelvis protecting portions 144L, 144R hold the pelvic region MW from the left and right sides and restrain the same from moving to the left or right, when the central inflatable portion 128 catches the upper body MU. Accordingly, the central inflatable portion 128 is able to protect the upper body MU of the occupant MP having the pelvic region MW restrained from moving to the left or right. Since the central inflatable portion 128 includes the deformation preventing means for preventing the upper end 128a region of the central inflatable portion 128 from bending forward at receiving the upper body MU of the occupant MP, and has a sufficient width for arresting generally an entirety of the upper body MU of the occupant MP, even in the event that the occupant MP is subjected to a force that moves the upper body MU largely towards the lower body MD, the central inflatable portion 128 will be prevented from bending and being deformed at the upper end 128a region, and protect the upper body MU adequately by restraining the upper body MU from moving towards the lower body MD, as can be seen in FIG. 24. In the meantime, the head protecting portions 142L, 142R disposed in the left and right sides of the upper end 128a region of the central inflatable portion 128 will cover left and right sides of the head MH of the occupant MP. As a consequence, the airbag 125 protects the occupant MP from the upper body MU including the head MH to the pelvic region MW adequately.

Therefore, the occupant protection system S2 in accordance with the second exemplary embodiment is able to protect not only the upper body MU of the occupant MP but also the pelvic region MW of the occupant MP adequately by the airbag 125.

In the occupant protection system S2 in accordance with the second exemplary embodiment, the central inflatable portion 128 as deployed includes, in the underside, the supported surface 138 that is supported by the thighs MT of the occupant MP, and this configuration constitutes the deformation preventing means for preventing the upper end 128a region of the central inflatable portion 128 as catching the occupant MP from bending forward. That is, as can be seen in FIG. 24, since the central inflatable portion 128 is supported by the thighs MT of the occupant MP by the supported surface 138, the central inflatable portion 128 will be prevented from bending or collapsing when catching the upper body MU of the occupant MP, thus restraining the upper body MU steadily.

More particularly, in the occupant protection system S2 in accordance with the second exemplary embodiment, the central inflatable portion 128 as fully deployed has a generally triangular prism shape whose axis extends generally in a left and right direction. Further, when viewed from the side, a shape of the central inflatable portion 128 as fully deployed is such that two apexes (i.e. the rear apexes) RP1 and RP2 are located one above another in the rear side while the remaining apex (i.e. the front apex) FP is located farther forward than the two apexes RP1 and RP2. With this configuration, even if the occupant MP is subjected to a force that moves the upper body MU largely towards the lower body MD, the central inflatable portion 128 will be merely compressed in an up and down direction but will not collapse forward, so that the central inflatable portion 128 will restrain the upper body MU of the occupant MP steadily. Further, the generally triangular prism shape of the central inflatable portion 128 will contribute to reduction of a volume of the airbag 125.

To describe further in detail, in the occupant protection system S2 in accordance with the second exemplary embodiment, the upper-body arresting surface 139 (i.e. the rear upper wall 130) of the central inflatable portion 128 for arresting the upper body MU of the occupant MP is configured to extend generally along an up and down direction in front of the occupant MP (in other words, along the upper body MU). When the occupant MP is subjected to a force that moves the upper body MU largely towards the lower body MD, the rear upper wall 130 will catch or receive the upper body MU over a generally entire area in the up and down direction and be pressed towards the rear lower wall 131 by its generally entire area in the up and down direction. In the meantime, the rear lower wall 131 serving as the supported surface 138 is supported by the thighs MT by its large area. Therefore, the central inflatable portion 128 will be compressed and obtain a high cushioning property, thus restraining the upper body MU of the occupant MP adequately.

In the occupant protection system S2 in accordance with the second exemplary embodiment, the deformation preventing means for preventing the upper end 128*a* region of the central inflatable portion 128 from bending forward at receiving the upper body MU of the occupant MP is constituted by the configuration that the central inflatable portion 128 as fully deployed has a generally triangular prism shape whose axis extends generally in the left and right direction. However, a shape of the central inflatable portion as fully deployed for constituting the deformation preventing means should not be limited thereby. By way of example, the shape of the central inflatable portion as fully deployed may also be a polygonal prism, a circular cylinder or a half cylinder whose axis extends generally along an up and down direction, or a polygonal prism, a circular cylinder or a half cylinder whose axis extends generally along a left and right direction, on condition that the central inflatable portion includes a supported surface in the underside and the rear upper wall is deployed at a position not very distant from the head of the occupant.

In the occupant protection system S2 in accordance with the second exemplary embodiment, the central inflatable portion 128 as fully deployed has a generally right triangular shape which has an oblique side in the front as viewed from the side, in which the upper rear apex RP1 is located immediately above the lower rear apex RP2, and the front apex FP1 is located in front of the lower rear apex RP2. However, the inflated shape of the central inflatable portion as viewed from the side should not be limited thereby. Alternatively, by way of example, the triangular shape of the central inflatable portion as viewed from the side may be such that a front apex is located in front of an intermediate position between upper and lower rear apexes (in other words, such that the rear lower wall extends diagonally rearward and downwardly), or such that the upper rear apex is located farther forward than the lower rear apex (in other words, such that the rear upper wall extends diagonally with respect to an up and down direction).

In the occupant protection system S2 in accordance with the second exemplary embodiment, the pelvis protecting portions 144L, 144R protrude rearward and also extend downwardly from the lower end 128*b* region of the central inflatable portion 128. Alternatively, the pelvis protecting portions may protrude from the lower end region of the central inflatable portion rearward only as long as it is able to protect the pelvic region of the occupant adequately.

In the occupant protection systems S1, S2 in accordance with the first and second exemplary embodiments, the seatbelt 7 and inflator 17 are mounted on the seat 1. With this configuration, even if the seat 1 is moved largely with respect to the vehicle, like, by being slid forward or backward, or turned, the occupant protection systems S1, S2 will be able to protect the occupant MP sitting in the seat 1 adequately. If such an advantageous effect does not have to be considered, the exemplary embodiments may be applied to a vehicle in which a retractor of the seatbelt is mounted on a vehicle body like a normal seatbelt for a vehicle and/or an inflator is mounted on the vehicle body.

An exemplary embodiment of the present disclosure relates to an occupant protection system for protecting an occupant sitting in a seat of a vehicle. The occupant protection system includes a seatbelt that includes a lap belt for arresting a pelvic region of the occupant, an inflator, and an airbag that is formed of a sheet material having flexibility and stored in a storage in the lap belt in a folded form, the airbag being configured to be inflated and deployed upward from the storage when fed with an inflation gas from the inflator. The airbag includes, when deployed, a main inflatable portion for protecting an upper body of the occupant, and a head protecting portion that is located in a vicinity of an upper end of the main inflatable portion for protecting a head of the occupant. The head protecting portion includes a front inflatable portion for covering a front side of the head, and a pair of side inflatable portions that extend rearward from both ends in a left and right direction of the front inflatable portion for covering sides of the head, each of the side inflatable portions being configured to be deployed in such a manner that a space is formed between itself and the head.

In the occupant protection system in accordance with the exemplary embodiment, the head protecting portion for protecting the head of the occupant includes the front inflatable portion for covering a front side of the head, and a pair of side inflatable portions that extend rearward from the left end and right end of the front inflatable portion for covering sides of the head. Each of the side inflatable portions is configured to be deployed in such a manner that a space is formed between itself and the head. With this configuration, the head protecting portion will be able to receive the head of the occupant, which moves forward with the upper body restrained by the main inflatable portion, in an area encircled by the side inflatable portions and the front inflatable portion, even in the event that the airbag is deployed in a slightly dislocated manner with respect to the upper body of the occupant. As a consequence, the head will be smoothly protected by the head protecting portion (i.e. the front inflatable portion and side inflatable portions). Further, the side inflatable portions will be able to catch the head steadily also in the event that the head moves diagonally forward. In the meantime, the upper body of the occupant will be restrained by the main inflatable portion adequately.

Therefore, the occupant protection system in accordance with the exemplary embodiment is able to protect not only the upper body but also the head of the occupant adequately.

In the occupant protection system of the exemplary embodiment, the side inflatable portions of the head protecting portion may be configured to extend from the front inflatable portion in such a manner as to draw apart from each other towards leading ends thereof, and be each disposed at a slant with respect to the front inflatable portion at an angle of 30° to 60°, at airbag deployment. With this configuration, the head protecting portion is able to cover an extended area in the left and right direction in front of the head by the front inflatable portion and side inflatable portions, and protect the head by the side inflatable portions steadily also in the event that the head moves diagonally forward.

In the occupant protection system of the exemplary embodiment, the head protecting portion may further internally include two tethers each of which connects a central portion in the left and right direction of a front side of the front inflatable portion and a bending point of each of the side inflatable portions from the front inflatable portion in a rear side of the head inflatable portion. This simple configuration will enable the head protecting portion to be inflated into such a shape that the side inflatable portions bend from the front inflatable portion.

Another exemplary embodiment of the present disclosure relates to an occupant protection system for protecting an occupant sitting in a seat of a vehicle. The occupant protection system includes a seatbelt that includes a lap belt for arresting a pelvic region of the occupant, an inflator, and an airbag that is formed of a sheet material having flexibility and stored in a storage in the lap belt in a folded form, the airbag being configured to be inflated and deployed upward from the storage when fed with an inflation gas from the inflator. The airbag includes, when deployed: a central inflatable portion for protecting an upper body of the occupant; a pair of head protecting portions that protrude rearward from left and right end regions of an upper end region of the central inflatable portion for covering sides of a head of the occupant; and a pair of pelvis protecting portions that protrude rearward from left and right end regions of a lower end region of the central inflatable portion for covering sides of a pelvic region of the occupant. The central inflatable portion as fully deployed has a sufficient width for arresting generally an entirety of the upper body of the occupant in an area between the head protecting portions and pelvis protecting portions. The central inflatable portion includes a deformation preventing means for preventing the upper end region of the central inflatable portion from bending forward at receiving the upper body of the occupant.

In the occupant protection system in accordance with the another exemplary embodiment, the airbag includes, in the lower end region of the central inflatable portion for protecting the upper body of the occupant, a pair of pelvis protecting portions that cover left and right sides of the pelvic region of the occupant and protect the pelvic region. The pelvis protecting portions hold the pelvic region from left and right sides and restrain the same from moving to the left or right, when the central inflatable portion catches the upper body. Accordingly, the central inflatable portion is able to protect the upper body of the occupant having the pelvic region restrained from moving to the left or right. Since the central inflatable portion includes the deformation preventing means for preventing the upper end region of the central inflatable portion from bending forward at receiving the upper body of the occupant, and has a sufficient width for arresting generally an entirety of the upper body of the occupant, even in the event that the occupant is subjected to a force that moves the upper body largely towards the lower body, the central inflatable portion will be prevented from bending and being deformed at the upper end region, and protect the upper body adequately by restraining the upper body from moving towards the lower body. In the meantime, the head protecting portions disposed in the left and right sides of the upper end region of the central inflatable portion cover left and right sides of the head of the occupant. As a consequence, the airbag protects the occupant from the upper body including the head to the pelvic region adequately.

Therefore, the occupant protection system in accordance with the another exemplary embodiment is able to protect not only the upper body but also the pelvic region of the occupant adequately by the airbag.

In the occupant protection system described above, the deformation preventing means may be constituted by a configuration that the central inflatable portion as deployed includes, in an underside thereof, a supported surface that is supported by thighs of the occupant. With this configuration, since the central inflatable portion is supported by thighs of the occupant by the supported surface steadily, the central inflatable portion will be prevented from bending or collapsing when catching the upper body of the occupant, thus arresting the upper body steadily.

More particularly, the deformation preventing means may be constituted by a configuration that the central inflatable portion as fully deployed has a generally triangular prism shape whose axis extends generally in a left and right direction, and has such a side view that two apexes are located one above another in a rear side while a remaining apex is located farther forward than the two apexes. With this configuration, even if the occupant is subjected to a force that moves the upper body largely towards the lower body, the central inflatable portion will be merely compressed in an up and down direction but will not collapse forward, so that the central inflatable portion will restrain the upper body of the occupant steadily. Further, the generally triangular prism shape of the central inflatable portion will contribute to reduction of a volume of the airbag.

What is claimed is:

1. An occupant protection system for protecting an occupant sitting in a seat of a vehicle, the occupant protection system comprising:
   a seatbelt that includes a lap belt which for arresting a pelvic region of the occupant;
   an inflator; and
   an airbag that is formed of a sheet material having flexibility and stored in a storage in the lap belt in a folded form, the airbag being configured to be inflated and deployed upward from the storage when fed with an inflation gas from the inflator,
   wherein the airbag includes, when deployed:
      a main inflatable portion for protecting an upper body of the occupant; and
   a head protecting portion that is located in a vicinity of an upper end of the main inflatable portion for protecting a head of the occupant,
   wherein the head protecting portion includes:
      a front inflatable portion for covering a front side of the head; and
      a pair of side inflatable portions that extend rearward from both ends in a left and right direction of the front inflatable portion for covering sides of the head, each of the side inflatable portions being configured to be deployed in such a manner that a space is formed between itself and the head,
   wherein the front inflatable portion is configured to be deployed in such a manner that a space is formed between itself and the head of the occupant,
   wherein, at airbag deployment, the side inflatable portions of the head protecting portion extend from the front inflatable portion in such a manner as to draw apart from each other towards leading ends thereof, and are each disposed at a slant with respect to the front inflatable portion at an angle of 30° to 60°,
   wherein the head protecting portion further internally includes two tethers each of which connects a central portion in the left and right direction of a front side of the front inflatable portion and a bending point of each of the side inflatable portions from the front inflatable portion in a rear side of the head inflatable portion, and wherein the head protection portion is formed into a generally board shape having a generally uniform thickness from the front inflatable portion to the side inflatable portions.

2. The occupant protection system of claim 1, wherein:

the main inflatable portion as fully deployed has a generally triangular prism shape whose axis extends generally in a left and right direction; and the main inflatable portion as deployed includes, in an underside thereof, a thigh contact surface that is configured to contact with upper surfaces of thighs of the occupant.

3. The occupant protection system of claim 2, further comprising a pair of thigh arresting portions that protrude downwardly from both ends in the left and right direction of a lower end region of the main inflatable portion at airbag deployment.

4. The occupant protection system of claim 1, wherein the seatbelt and the inflator are mounted on the seat.

5. An occupant protection system for protecting an occupant sitting in a seat of a vehicle, the occupant protection system comprising:

a seatbelt that includes a lap belt for arresting a pelvic region of the occupant;

an inflator; and an airbag that is formed of a sheet material having flexibility and stored in a storage in the lap belt in a folded form, the airbag being configured to be inflated and deployed upward from the storage when fed with an inflation gas from the inflator, wherein the airbag includes, when deployed:

a central inflatable portion for protecting an upper body of the occupant;

a pair of head protecting portions that protrude rearward from left and right end regions of an upper end region of the central inflatable portion for covering sides of a head of the occupant; and a pair of pelvis protecting portions that protrude rearward and downwardly from left and right end regions of a lower end region of the central inflatable portion for covering sides of a pelvic region of the occupant;

wherein the central inflatable portion as fully deployed has a sufficient width for arresting generally an entirety of the upper body of the occupant in an area between the head protecting portions and pelvis protecting portions; and wherein the central inflatable portion includes a deformation preventing means for preventing the upper end region of the central inflatable portion from bending forward at receiving the upper body of the occupant.

6. The occupant protection system of claim 5, wherein the deformation preventing means is constituted by a configuration that the central inflatable portion as deployed includes, in an underside thereof, a supported surface that is supported by thighs of the occupant.

7. The occupant protection system of claim 5, wherein the deformation preventing means is constituted by a configuration that the central inflatable portion as fully deployed has a generally triangular prism shape whose axis extends generally in a left and right direction, and that a shape of the central inflatable portion as fully deployed is such that two apexes are located one above another in a rear side while a remaining apex is located farther forward than the two apexes, when viewed from a side.

8. The occupant protection system of claim 5, wherein the seatbelt and the inflator are mounted on the seat.

* * * * *